United States Patent
Au et al.

(10) Patent No.: US 12,524,425 B2
(45) Date of Patent: Jan. 13, 2026

(54) TASK-SPECIFIC GRAPH SET ANALYSIS AND VISUALIZATION

(71) Applicant: Fujitsu Limited, Kawasaki (JP)

(72) Inventors: Wing Yee Au, Saratoga, CA (US); Kanji Uchino, Santa Clara, CA (US)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 18/466,867

(22) Filed: Sep. 14, 2023

(65) Prior Publication Data

US 2025/0094436 A1    Mar. 20, 2025

(51) Int. Cl.
*G06F 16/20* (2019.01)
*G06F 16/25* (2019.01)
*G06F 16/901* (2019.01)

(52) U.S. Cl.
CPC ........ *G06F 16/254* (2019.01); *G06F 16/9024* (2019.01)

(58) Field of Classification Search
CPC ........................... G06F 16/254; G06F 16/9024
USPC ................. 707/602, 604, 617, 626, 772
See application file for complete search history.

(56) References Cited

U.S. PATENT DOCUMENTS

| | | | | |
|---|---|---|---|---|
| 6,278,967 B1* | 8/2001 | Akers | ................... | G06F 40/211 |
| | | | | 704/7 |
| 7,877,345 B2* | 1/2011 | Nigam | ................... | G06F 40/253 |
| | | | | 706/55 |
| 8,141,669 B1* | 3/2012 | Laymaster | ........... | B60K 7/0007 |
| | | | | 180/65.6 |
| 10,372,713 B1* | 8/2019 | Blake | ................... | G16C 20/70 |
| 2003/0187587 A1* | 10/2003 | Swindells | .............. | G16B 50/00 |
| | | | | 707/999.001 |
| 2006/0069589 A1* | 3/2006 | Nigam | .................. | G06F 40/253 |
| | | | | 706/55 |
| 2009/0164417 A1* | 6/2009 | Nigam | .................. | G06Q 30/02 |

(Continued)

FOREIGN PATENT DOCUMENTS

EP           1454262         *  9/2004
WO    WO2006039566 A1  *  4/2006

OTHER PUBLICATIONS

Xia et al., "Geometric Graph Representation Learning on Protein Structure Prediction". ACM 2021.*

(Continued)

*Primary Examiner* — Daniel A Kuddus
(74) *Attorney, Agent, or Firm* — Fujitsu Intellectual Property Center

(57) ABSTRACT

In an embodiment, a set of data instances associated with a domain is received. A set of simplification rules is applied on the received set of data instances. A set of simplified representations associated with the received set of data instances is determined. A set of transformation rules on the is applied received set of data instances. A set of graph representations associated with the received set of data instances is determined. A set of first lambda functions is executed on a set of representations. The set of representations includes at least one of the determined set of simplified representations or the determined set of graph representations. A set of instance properties associated with the set of representations is determined. The set of representations is analyzed. First information associated with the set of representations is rendered based on the analysis of the set of representations.

20 Claims, 12 Drawing Sheets

(56) References Cited

U.S. PATENT DOCUMENTS

| | | | | |
|---|---|---|---|---|
| 2011/0093417 | A1* | 4/2011 | Nigam | G06F 40/253 |
| | | | | 706/47 |
| 2014/0074826 | A1* | 3/2014 | Cooper | G06F 40/30 |
| | | | | 707/722 |
| 2016/0275180 | A1* | 9/2016 | Matskevich | G06F 16/93 |
| 2018/0173698 | A1* | 6/2018 | Dubey | G06F 16/3347 |
| 2020/0184016 | A1* | 6/2020 | Roller | G06N 3/08 |
| 2020/0242146 | A1* | 7/2020 | Kalukin | G06F 16/3329 |
| 2023/0117206 | A1* | 4/2023 | Venkateshwaran | G06Q 40/08 |
| | | | | 704/9 |
| 2023/0252239 | A1* | 8/2023 | Venkateshwaran | G06N 5/04 |
| | | | | 704/9 |
| 2023/0394235 | A1* | 12/2023 | Rahman | G06F 40/242 |
| 2024/0184810 | A1* | 6/2024 | Guberman | G06Q 50/18 |

OTHER PUBLICATIONS

Apache OpenNLP Developer Documentation—The Apache Software Foundation (2023) https://opennlp.apache.org/docs/1.9.3/manual/opennip.html.

CoreNLP—The Stanford NLP Group (2010-2023) https://stanfordnlp.github.io/CoreNLP/.

Sehnal David, et al. "Mol* Viewer: modern web app for 3D visualization and analysis of large biomolecular structures." Nucleic acids research 49.W1 (2021): W431-W437.

Zhang Xikun, et al. "Greaselm: Graph reasoning enhanced language models for question answering." arXiv preprint arXiv:2201.08860 (2022).

Yao Liang, et al. "Graph Convolutional Networks for Text Classification." arXiv preprint arXiv:1809.05679 (2018).

Gligorijević Vladimir, et al. "Structure-based protein function prediction using graph convolutional networks." Nature communications 12.1 (2021): 3168.

AWS Lambda Developer Guide—Amazon Web Services, Inc (2023) https://docs.aws.amazon.com/pdfs/lambda/latest/dg/lambda-dg.pdf.

Extended European Search Report dated Feb. 7, 2025 for corresponding European Patent Application No. 24198407.9, 8 pages.

Li, Michelle M. et al., "Graph Representation Learning in Biomedicine." arXiv preprint arXiv:2104.04883, Jun. 10, 2022, 51 pages.

Xia, Tian et al., "Geometric Graph Representation Learning on Protein Structure Prediction." In Proceedings of the 27th ACM SIGKDD Conference on Knowledge Discovery & Data Mining, Research Track Paper, pp. 1873-1883, Aug. 14-18, 2021.

Zhong, Zhiqiang et al., "Knowledge-augmented Graph Machine Learning for Drug Discovery: A Survey." arXiv preprint arXiv:2302.08261, (2023), pp. 1-37.

* cited by examiner

```
from bllipparser import RerankingParser rrp = RerankingParser.fetch_and_load('WSJ-PTB3', verbose=True)
sx = rrp.simple_parse(text)

from nltk import Tree st = Tree.fromstring(sx)

def glambda_convoluted(tree):
    return len(tree.leaves()) / tree.height()

def glambda_descriptive(tree):
    nouns = [q for q in tree.pos() if q[1][0] == 'N']
    verbs = [q for q in tree.pos() if q[1][0] == 'V']
    adjs = [q for q in tree.pos() if q[1][0] == 'J']
    advs = [q for q in tree.pos() if q[1][0] == 'R']
    prons = [q for q in tree.pos() if q[1][0] == 'P']
    return (len(set(adjs)) + len(set(advs))) / (len(set(nouns)) + len(set(verbs)) + len(set(prons)))

print('Convoluted:', glambda_convoluted(st))
print('Descriptive:', glambda_descriptive(st))
```

FIG. 9A

```
glist = [[k, [q[1:] for q in v]] for k, v in itertools.groupby(flist, lambda x: x[0])]
import math
def glambda_structure_count(v):
    return len(v)
def glambda_backbone_count(v):
    return sum([int(q[6]) for q in v])
def glambda_structure_volume(v):
    x_coord = [float(q[1]) for q in v]
    y_coord = [float(q[2]) for q in v]
    z_coord = [float(q[3]) for q in v]
    x_range = max(x_coord)-min(x_coord)
    y_range = max(y_coord)-min(y_coord)
    z_range = max(z_coord)-min(z_coord)
    return int(x_range * y_range * z_range)
def glambda_backbone_length(v):
    xyz_coord = [[float(q[1]), float(q[2]), float(q[3])] for q in v if q[0] == 'CA']
    src = xyz_coord[0:-1]
    dst = xyz_coord[1:]
    distance = [math.sqrt((d[0]-s[0])**2 + (d[1]-s[1])**2 + (d[2]-s[2])**2) for s, d in zip(src, dst)]
    return int(sum(distance))
glambda_list = [glambda_structure_count, glambda_backbone_count, glambda_structure_volume, glambda_backbone_length]
```

FIG. 9B

TASK-SPECIFIC GRAPH SET ANALYSIS AND VISUALIZATION

FIELD

The embodiments discussed in the present disclosure are related to task-specific graph set analysis and visualization.

BACKGROUND

Advancements in the field of graph data analysis and exploration have led to development of analytical and visualization frameworks that may be used for local and global analyses of graphs in a graph dataset Such local and global analyses may involve determination of a set of graph properties (for example, a count of nodes, cycles, edges, loops, or disjoints, density, diameter, and the like) and subsequent characterization of the graphs based on the determined set of graph properties. A distribution of values or range of values associated with each graph property of the set of graph properties may facilitate generation of graph visualizations. The graph visualizations may facilitate graph exploration at a local level or a global level, comparison of amongst graphs of the graph dataset, determination of relationships between the graphs, and eligibility of the graphs of the graph dataset for usage as training data for creation of a graph machine learning model. However, such visualization of the graph dataset may be applicable for simple graphs such as small molecules, citation networks or knowledge graphs. For complex data instances, such generic graph analysis based on graph property computation may be not be feasible. Moreover, visualizing a complex dataset individually at the local level or collectively as a group (at the global level) may be complex.

The subject matter claimed in the present disclosure is not limited to embodiments that solve any disadvantages or that operate only in environments such as those described above. Rather, this background is only provided to illustrate one example technology area where some embodiments described in the present disclosure may be practiced.

SUMMARY

According to an aspect of an embodiment, a method may include a set of operations, which may include receiving a set of data instances where each data instance of the set of data instances may be associated with a domain. The set of operations may further include application of a set of simplification rules on the received set of data instances. The set of operations may further include determination of a set of simplified representations associated with the received set of data instances, based on the application of the set of simplification rules. The set of operations may further include application of a set of transformation rules on the received set of data instances. The set of operations may further include determination of a set of graph representations associated with the received set of data instances, based on the application of the set of transformation rules. The set of operations may further include execution of a set of first lambda functions on a set of representations including the determined set of simplified representations and the determined set of graph representations. The set of operations may further include determination of a set of instance properties associated with the set of representations, based on the execution of the set of first lambda functions. The set of operations may further include analyzing the set of representations, based on the determined set of instance properties. The set of operations may further include controlling rendering of first information associated with the set of representations, based on the analysis of the set of representations.

The objects and advantages of the embodiments will be realized and achieved at least by the elements, features, and combinations particularly pointed out in the claims.

Both the foregoing general description and the following detailed description are given as examples and are explanatory and are not restrictive of the invention, as claimed.

BRIEF DESCRIPTION OF THE DRAWINGS

Example embodiments will be described and explained with additional specificity and detail through the use of the accompanying drawings in which:

FIG. 9A is a diagram that illustrates an exemplary scenario for executing a set of first lambda functions on a set of representations associated with textual data;

FIG. 9B is a diagram that illustrates an exemplary scenario for executing a set of first lambda functions on the set of representations associated with protein data.

Figure 1:
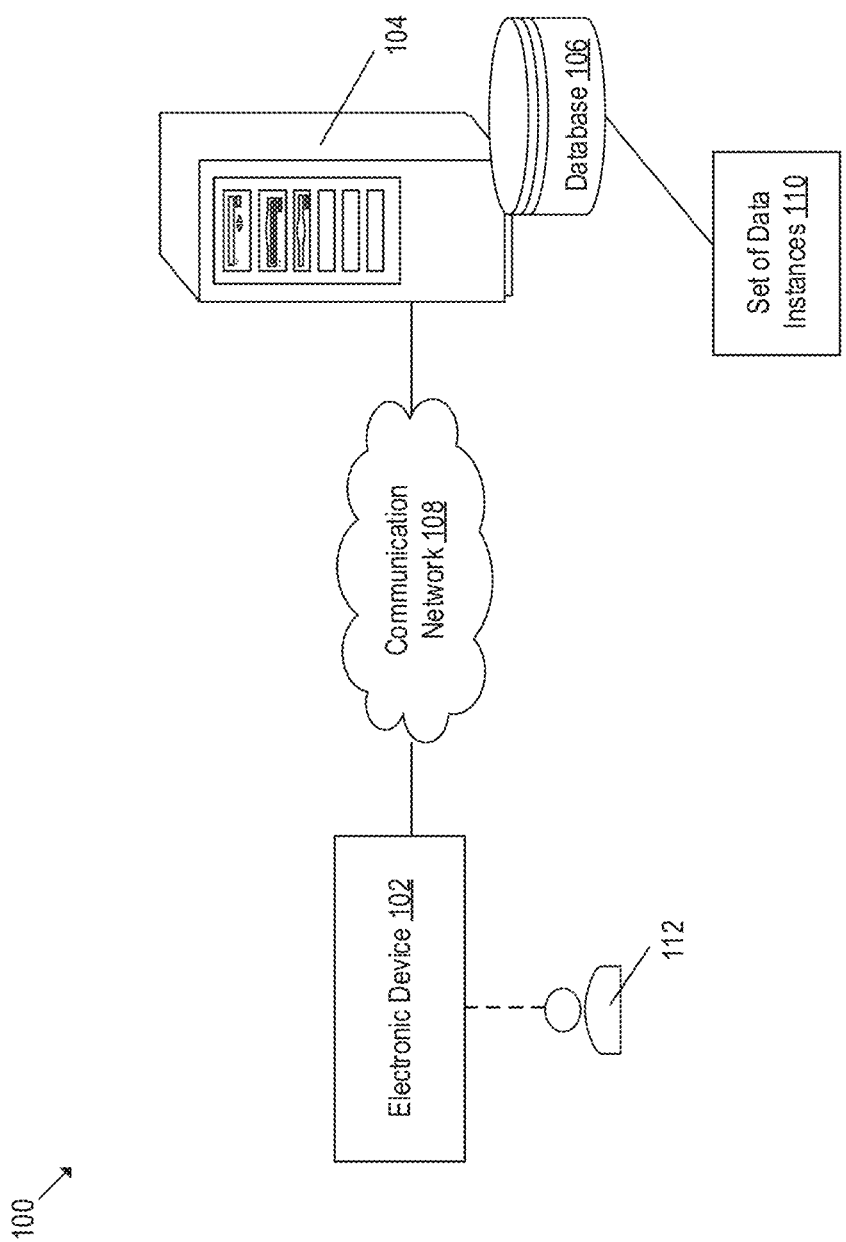
FIG. 1 is a diagram representing an example environment related to a task-specific graph set analysis and visualization.

all according to at least one embodiment described in the present disclosure.

DESCRIPTION OF EMBODIMENTS

Some embodiments described in the present disclosure relate to methods and systems for task-specific graph set analysis and visualization. In the present disclosure, a set of data instances may be received. Each data instance of the set of data instances may be associated with a domain. Next, a set of simplification rules may be applied on the received set of data instances. Based on the application of the set of simplification rules, a set of simplified representations associated with the received set of data instances may be determined. Thereafter, a set of transformation rules may be applied on the received set of data instances. Based on the application of the set of transformation rules, a set of graph representations associated with the received set of data instances may be determined. A set of first lambda functions may be executed on a set of representations. The set of representations may include the determined set of simplified representations and the determined set of graph representations. Based on the execution of the set of first lambda functions, a set of instance properties associated with the set of representations may be determined. Based on the determined set of instance properties, the set of representations may be analyzed. Based on the analysis of the set of representation, a rendering of first information associated with the set of representations may be controlled.

According to one or more embodiments of the present disclosure, the technological field of graph analysis, exploration, and visualization may be improved by configuring a computing system in a manner that the computing system may be able to execute task-specific graph set analysis and visualization, compute specific data instance properties, and render an embedded viewer for visualization of a single data instance or a set of data instances. The computing system may receive a set of data instances. Each data instance of the set of data instances may be associated with a domain. The computing system may apply a set of simplification rules on the received set of data instances. The computing system may determine a set of simplified representations associated with the received set of data instances, based on the application of the set of simplification rules. The computing system may apply a set of transformation rules on the received set of data instances. The computing system may determine a set of graph representations associated with the received set of data instances, based on the application of the set of transformation rules. The computing system may execute a set of first lambda functions on a set of representations that may include the determined set of simplified representations and the determined set of graph representations. The computing system may determine a set of instance properties associated with the set of representations, based on the execution of the set of first lambda functions. The computing system may analyze the set of representations, based on the determined set of instance properties. The computing system may control rendering of first information associated with the set of representations, based on the analysis of the set of representations.

It may be appreciated that graphical neural network (GNN) models that may be used for modeling and representation of complex data, tabular data, protein data, language data, and images. Such data may be first, converted into graphs for training of machine learning models. A set of graph properties, for example, a cycle count, a density, and the like may be mathematically calculated to characterize a graph. A collective usage of graph properties distribution may enable data scientists to visualize and analyze a graphical dataset. Such approach of visualization of the graphical dataset may be used for simple graphs such as small molecules, citation networks or knowledge graphs. However, for complex data, such generic graph analysis and property computation may be inadequate. Thus, there is a need for efficient techniques for task-specific graph set analysis and visualization.

The present disclosure may provide a method that facilitates task-specific graph set analysis and visualization. For such analysis and visualization, an electronic device of the present disclosure may employ a method that may convert complex data instances (such as textual data, protein data, and the like) into simplified representations. The method may further convert the complex data instances into the set of graph representations. The simplified representations and the graph representations may be used for a training of a graph machine learning model. Moreover, the method may allow customized data instance property computation based on a type and complexity of the data instance. The customized data instance property computation may involve determination of tested and validated lambda functions that correspond to properties of complex data instances. Furthermore, the method may further facilitate unification of native data views and framework provided views. The unification may enable determination of correlation of each of the simplified representations and the graph representation with the data instance counterparts.

In some embodiments, the disclosed electronic device may display the first information based on a first user input indicative of a user-selection of a view-type. An instance set view may enable a user to select a group of simplified representations or a group of graph representations that the user may wish to view at once. A single instance view may enable the user to view the simplified representation, the graph representation, and embedded data instance view at once. To understand the relation between the simplified representation, the graph representation, and embedded data instance view, the electronic device may determine a correlation between the simplified representation, the graph representation, and embedded data instance view.

Embodiments of the present disclosure are explained with reference to the accompanying drawings.

FIG. 1 is a diagram representing an example environment related to a task-specific graph set analysis and visualization, according to at least one embodiment described in the present disclosure. With reference to FIG. 1, there is shown an environment 100. The environment 100 may include an electronic device 102, a server 104, a database 106, and a communication network 108. The electronic device 102 and the server 104 may be communicatively coupled to one another, via the communication network 108. The database 106 may include a set of data instances 110. In FIG. 1, there is further shown a user 112, who may be associated with or operate the electronic device 102.

The electronic device 102 may include suitable logic, circuitry, and interfaces that may be configured to perform task-specific graph set analysis and generate visualizations of simplified and graph representations extracted from complex data instances. The electronic device 102 may be further configured to receive the set of data instances 110 and may apply a set of simplification rules on the received set of data instances 110. The electronic device 102 may determine a set of simplified representations associated with the received set of data instances 110, based on the application of the set of simplification rules. The electronic device 102 may further apply a set of transformation rules on the received set of data instances 110. The electronic device 102 may determine a set of graph representations associated with the received set of data instances 110, based on the application of the set of transformation rules. The electronic device 102 may execute a set of first lambda functions on a set of representations including the determined set of simplified representations and the determined set of graph representations. The electronic device 102 may determine a set of instance properties associated with the set of representations, based on the execution of the set of first lambda functions. The electronic device 102 may analyze the set of representations, based on the determined set of instance properties. The electronic device 102 may control rendering of first information associated with the set of representations, based on the analysis of the set of representations.

Examples of the electronic device 102 may include, but are not limited to, a computing device, a hardware-based annealer device, a digital-annealer device, a quantum-based or quantum-inspired annealer device, a smartphone, a cellular phone, a mobile phone, a gaming device, a mainframe machine, a server, a computer workstation, and/or a consumer electronic (CE) device.

The server 104 may include suitable logic, circuitry, and interfaces, and/or code that may be configured transmit the set of data instances 110 to the electronic device 102. In some embodiments, the server 104 may receive the set of data instances 110 from the electronic device 102. The server 104 may apply the set of simplification rules on the received set of data instances 110. The server 104 may determine the set of simplified representations associated with the received set of data instances 110, based on the application of the set of simplification rules. The server 104 may apply the set of transformation rules on the received set of data instances 110. The server 104 may determine the set of graph representations associated with the received set of data instances 110, based on the application of the set of transformation rules. The server 104 may execute the set of first lambda functions on the set of representations including the determined set of simplified representations and the determined set of graph representations. The server 104 may determine the set of instance properties associated with the set of representations, based on the execution of the set of first lambda functions. The server 104 may analyze the set of representations, based on the determined set of instance properties. The server 104 may control rendering of the first information associated with the set of representations, based on the analysis of the set of representations.

The server 104 may be implemented as a cloud server and may execute operations through web applications, cloud applications, HTTP requests, repository operations, file transfer, and the like. Other example implementations of the server 104 may include, but are not limited to, a database server, a file server, a web server, a media server, an application server, a mainframe server, or a cloud computing server.

In at least one embodiment, the server 104 may be implemented as a plurality of distributed cloud-based resources by use of several technologies that may be well known to those ordinarily skilled in the art. A person with ordinary skill in the art will understand that the scope of the disclosure may not be limited to the implementation of the server 104 and the electronic device 102 as two separate entities. In certain embodiments, the functionalities of the server 104 can be incorporated in its entirety or at least partially in the electronic device 102, without a departure from the scope of the disclosure.

The database 106 may include suitable logic, interfaces, and/or code that may be configured to store the set of data instances 110. The database 106 may be derived from data off a relational or non-relational database, or a set of comma-separated values (csv) files in conventional or big-data storage. The database 106 may be stored or cached on a device, such as a server (e.g., the server 104) or the electronic device 102. The device storing the database 106 may be configured to receive a query for the set of data instances 110 from the electronic device 102. In response, the device of the database 106 may be configured to retrieve and provide the queried set of data instances 110 to the electronic device 102 based on the received query. In some embodiments, the database 106 may be hosted on a plurality of servers stored at same or different locations. The operations of the database 106 may be executed using hardware including a processor, a microprocessor (e.g., to perform or control performance of one or more operations), a field-programmable gate array (FPGA), or an application-specific integrated circuit (ASIC). In some other instances, the database 106 may be implemented using software.

The communication network 108 may include a communication medium through which the electronic device 102 and the server 104, (and the device hosting the database 106) may communicate. The communication network 108 may be one of a wired connection or a wireless connection. Examples of the communication network 108 may include, but are not limited to, the Internet, a cloud network, Cellular or Wireless Mobile Network (such as, Long-Term Evolution and 5G New Radio), a Wireless Fidelity (Wi-Fi) network, a satellite network (e.g., a network of a set of low earth orbit satellites), a Personal Area Network (PAN), a Local Area Network (LAN), or a Metropolitan Area Network (MAN). Various devices in the environment 100 may be configured to connect to the communication network 108 in accordance with various wired and wireless communication protocols. Examples of such wired and wireless communication protocols may include, but are not limited to, at least one of a Transmission Control Protocol and Internet Protocol (TCP/IP), User Datagram Protocol (UDP), Hypertext Transfer Protocol (HTTP), File Transfer Protocol (FTP), Zig Bee, EDGE, IEEE 802.11, light fidelity (Li-Fi), 802.16, IEEE 802.11s, IEEE 802.11g, multi-hop communication, wireless access point (AP), device to device communication, cellular communication protocols, and Bluetooth (BT) communication protocols.

The set of data instances 110 may include complex data that may need to be analyzed by the electronic device 102 and transformed into simplified and graph representations. In an embodiment, the set of data instances 110 may be a set of textual datasets. In another embodiment, the set of data instances 110 may be a set of protein datasets.

In operation, the electronic device 102 may receive the set of data instances 110. Each data instance of the set of data instances 110 may be associated with a domain. The domain may indicate a type of the set of data instances 110. In an example, the domain may be a textual data domain. Herein, the set of data instances 110 may include textual data, such a textual document. In another example, the domain may be a protein data domain. Herein, the set of data instances 110 may include protein data, such as, structures of protein molecules. Each data instance of the set of data instances 110 may be a complex data representation. Details related to the reception of the set of data instances 110 are further provided, for example, in FIG. 3A.

The electronic device 102 may further apply the set of simplification rules on the received set of data instances 110. As the received set of data instances 110 may be complex, the received set of data instances 110 may be simplified based on application of the set of simplification rules. The set of simplification rules may be specific for each domain. For example, for data instances related to the textual data domain, a first simplification rule of the set of simplification rules may be to determine words and phrase tokens from each paragraph (i.e., data instance). A second simplification rule of the set of simplification rules may be to apply tokenization on each sentence of each paragraph. A third simplification rule may be to generate a bag-of-word vector for each sentence. Similarly, for data instances related to the protein data domain, a simplification rule of the set of simplification rules may be to record coordinates and atom types for each atom of each protein (i.e., data instance). Details related to the application of the set of simplification rules are further provided, for example, in FIG. 3A.

The electronic device 102 may further determine the set of simplified representations associated with the received set of data instances 110, based on the application of the set of simplification rules. The set of simplified representations may resemble the received set of data instances 110. Details related to the determination of the set of simplified representations are further provided, for example, in FIG. 3A.

The electronic device 102 may further apply the set of transformation rules on the received set of data instances 110. The set of transformation rules may be specific for each domain to which a data instance of the set of data instances 110 may be associated to. For example, for data instances related to the textual data domain, a first transformation rule of the set of transformation rules may be to parse every sentence in each paragraph (i.e., a data instance) into a parse-tree. A second transformation rule of the set of transformation rules may be to merge the parse-trees into a graph. For data instances related to the protein data domain, a first transformation rule of the set of transformation rules may be to record information associated with backbone atoms of each protein (i.e., a data instance). A second transformation rule of the set of transformation rules may be to store edge information of atoms of the corresponding protein that may be connected to the to a backbone atom. Details related to the application of the set of transformation rules are further provided, for example, in FIG. 3A.

The electronic device 102 may further determine the set of graph representations associated with the received set of data instances 110, based on the application of the set of transformation rules. The set of graph representations may not exactly resemble the received set of data instances 110. However, a correlation may exist between the set of graph representations and the received set of data instances 110. Details related to the determination of the set of graph representations are further provided, for example, in FIG. 3A.

The electronic device 102 may further execute the set of first lambda functions on the set of representations including the determined set of simplified representations and the determined set of graph representations. It may be appreciated that for 2-dimensional graphs, graph properties (such as densities, connectivity, and cycles) associated with the 2-dimensional graphs may be computed based on standard algorithms. However, for the complex data (such as, the set of data instances 110), computation of the standard graph properties may not be useful for analysis, exploration, or visualization of the data instances of the set of data instances 110. For task-specific analysis of complex data instances, user-defined or customized properties of the data instances may be required to be determined. In accordance with an embodiment, the customized properties of the data instances may correspond to checked and tested lambda functions (i.e., the set of first lambda functions). The set of first lambda functions may be applied on the set of representations (i.e., each simplified representation of the set of simplified representations and each graph representation of the set of graph representations), and, based on such applications, a sortable value may be determined as output. Details related to the execution of the set of first lambda functions are further provided, for example, in FIG. 3A.

The electronic device 102 may further determine the set of instance properties associated with the set of representations, based on the execution of the set of first lambda functions. The set of first lambda functions may be applied on the set of representations for determination of the set of instance properties. A lambda executor may treat the set of first lambda functions as anonymous functions that may be applicable on a data structure such as, a graph or simple representation of a data instance so as to determine statistics and/or instance properties associated with the data instance. A lambda function may take one data instance of the received set of data instances 110, either in a simplified form or a graph representation of the corresponding data instance as an input and a set of instance properties associated with the each of the received set of data instances 110 as outputs. Details related to the determination of the set of instance properties are further provided, for example, in FIG. 3A.

The electronic device 102 may analyze the set of representations based on the determined set of instance properties. Each simplified representation (corresponding to a data instance of the set of data instances 110) and each graph representation (corresponding to a data instance of the set of data instances 110) may be analyzed based on the determined set of instance properties. Details related to the analysis of the set of representations are further provided, for example, in FIG. 3A.

The electronic device 102 may control rendering of the first information associated with the set of representations, based on the analysis of the set of representations. The set of representations may include the set of simplified representations and the set of graph representations. Thus, based on the analysis of the set of representations, the first information may be determined. The determined first information may be displayed on a display device associated with the electronic device 102. Details related to the rendering of the first information are further provided, for example, in FIG. 3B.

The disclosed electronic device 102 may be thus, used for task-specific graph set analysis and visualization. Conventionally, users may visualize and analyze a data instance individually. However, the disclosed electronic device 102 may enable the user 112 to globally visualize and analyze the received set of data instances 110. Moreover, the disclosed electronic device 102 may enable the user 112 to interactively explore relations of the set of instance properties and the set of representations. Furthermore, as standard graph properties may not be useful in analyzing complex data instances, the set of instance properties may be determined for analysis of the complex data instances.

Modifications, additions, or omissions may be made to FIG. 1 without departing from the scope of the present disclosure. For example, the environment 100 may include more or fewer elements than those illustrated and described in the present disclosure. For instance, in some embodiments, the environment 100 may include the electronic device 102 but not the database 106. In addition, in some embodiments, the functionality of each of the database 106 and the server 104 may be incorporated into the electronic device 102, without a deviation from the scope of the disclosure.

Figure 2:
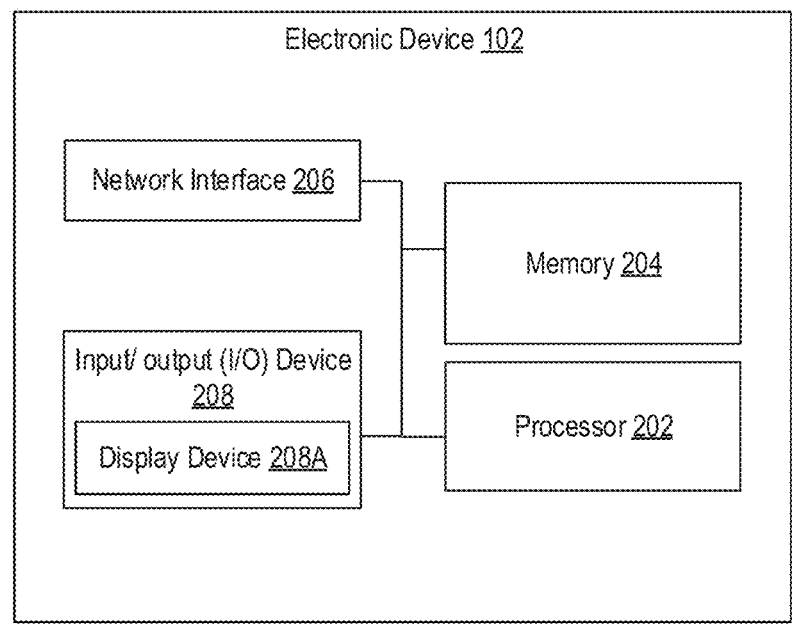
FIG. 2 is a block diagram that illustrates an exemplary electronic device for the task-specific graph set analysis and visualization.

FIG. 2 is a block diagram that illustrates an exemplary electronic device for the task-specific graph set analysis and visualization, in accordance with at least one embodiment described in the present disclosure. FIG. 2 is explained in conjunction with elements from FIG. 1. With reference to FIG. 2, there is shown a block diagram 200 of the electronic device 102. The electronic device 102 may include a processor 202, a memory 204, a network interface 206, and an input/output (I/O) device 208 (including, a display device 208A).

The processor 202 may include suitable logic, circuitry, and interfaces that may be configured to execute a set of instructions stored in the memory 204. The processor 202 may be configured to execute program instructions associated with different operations to be executed by the electronic device 102. For example, some of the operations may include reception of the set of data instances 110. The processor 202 may control rendering of an electronic user interface (UI) that comprises one or more UI elements configured to display first information including the set of representations associated with the received set of data instances 110. The processor 202 may receive, via the displayed electronic UI, a first user input indicative of a user-selection of a view-type associated with the set of representations, wherein the view-type corresponds to at least one of a single instance view or an instance set view. The processor 202 may apply a set of simplification rules on the received set of data instances 110. The processor 202 may determine the set of simplified representations associated with the received set of data instances 110, based on the application of the set of simplification rules. The processor 202 may apply the set of transformation rules on the received set of data instances 110. The processor 202 may determine the set of graph representations associated with the received set of data instances 110, based on the application of the set of transformation rules. The processor 202 may execute the set of first lambda functions on the set of representations including the determined set of simplified representations and the determined set of graph representations. The processor 202 may determine the set of instance properties associated with the set of representations, based on the execution of the set of the first lambda functions. The processor 202 may analyze the set of representations, based on the determined set of instance properties. The processor 202 may control, via the displayed electronic UI, rendering of the first information associated with the set of representations, based on the analysis of the set of representations and the received first user input. The processor 202 may be implemented based on a number of processor technologies known in the art. Examples of the processor technologies may include, but are not limited to, a Central Processing Unit (CPU), X86-based processor, a Reduced Instruction Set Computing (RISC) processor, an Application-Specific Integrated Circuit (ASIC) processor, a Complex Instruction Set Computing (CISC) processor, a Graphical Processing Unit (GPU), a co-processor, or a combination thereof.

Although illustrated as a single processor in FIG. 2, the processor 202 may include any number of processors configured to, individually or collectively, perform or direct performance of any number of operations of the electronic device 102, as described in the present disclosure. Additionally, one or more of the processors may be present on one or more different electronic devices, such as different servers. In some embodiments, the processor 202 may be configured to interpret and/or execute program instructions and/or process data stored in the memory 204. After the program instructions are loaded into the memory 204, the processor 202 may execute the program instructions.

The memory 204 may include suitable logic, circuitry, and interfaces that may be configured to store the one or more instructions to be executed by the processor 202. The one or more instructions stored in the memory 204 may be executed by the processor 202 to perform the different operations of the processor 202 (and the electronic device 102). The memory 204 that may be configured to store the set of data instances 110, the set of simplification rules, the set of simplified representations, the set of transformation rules, set of graph representations, the set of first lambda functions, the set of instance properties, and the first information. Examples of implementation of the memory 204 may include, but are not limited to, Random Access Memory (RAM), Read Only Memory (ROM), Electrically Erasable Programmable Read-Only Memory (EEPROM), Hard Disk Drive (HDD), a Solid-State Drive (SSD), a CPU cache, and/or a Secure Digital (SD) card.

The network interface 206 may include suitable logic, circuitry, and interfaces that may be configured to facilitate communication between the processor 202, the server 104, and a device hosting the database 106 (and/or any other device in the environment 100), via the communication network 108. The network interface 206 may be implemented by use of various known technologies to support wired or wireless communication of the electronic device 102 with the communication network 108. The network interface 206 may include, but is not limited to, an antenna, a radio frequency (RF) transceiver, one or more amplifiers, a tuner, one or more oscillators, a digital signal processor, a coder-decoder (CODEC) chipset, a subscriber identity module (SIM) card, or a local buffer circuitry. The network interface 206 may be configured to communicate via wireless communication with networks, such as the Internet, an Intranet, or a wireless network, such as a cellular telephone network, a wireless local area network (LAN), a satellite network, and a metropolitan area network (MAN). The wireless communication may be configured to use one or more of a plurality of communication standards, protocols and technologies, such as Global System for Mobile Communications (GSM), Enhanced Data GSM Environment (EDGE), wideband code division multiple access (W-CDMA), Long Term Evolution (LTE), 5th Generation (5G) New Radio (NR), code division multiple access (CDMA), time division multiple access (TDMA), Bluetooth, Wireless Fidelity (Wi-Fi) (such as IEEE 802.11a, IEEE 802.11b, IEEE 802.11g or IEEE 802.11n), voice over Internet Protocol (VoIP), light fidelity (Li-Fi), Worldwide Interoperability for Microwave Access (Wi-MAX), a protocol for email, instant messaging, and a Short Message Service (SMS).

The I/O device 208 may include suitable logic, circuitry, and interfaces that may be configured to receive an input from the user 112 and provide an output based on the received input. For example, the I/O device 208 may receive a user-selection of a view-type associated with the set of representations based on a first user input from the user 112. Further, the I/O device 208 may render the electronic UI. The I/O device 208 which may include various input and output devices, may be configured to communicate with the processor 202. Examples of the I/O device 208 may include, but are not limited to, a touch screen, a keyboard, a mouse, a joystick, a microphone, a display device (e.g., the display device 208A), and a speaker.

The display device 208A may include suitable logic, circuitry, and interfaces that may be configured to display the first information associated with the set of representations. The display device 208A may be a touch screen which may enable a user to provide a user-input via the display device 208A. The touch screen may be at least one of a resistive touch screen, a capacitive touch screen, or a thermal touch screen. The display device 208A may be realized through several known technologies such as, but not limited to, at least one of a Liquid Crystal Display (LCD) display, a Light Emitting Diode (LED) display, a plasma display, or an Organic LED (OLED) display technology, or other display devices. In accordance with an embodiment, the display device 208A may refer to a display screen of a head mounted device (HMD), a smart-glass device, a see-through display, a projection-based display, an electro-chromic display, or a transparent display.

Modifications, additions, or omissions may be made to the example electronic device 102 without departing from the scope of the present disclosure. For example, in some embodiments, the example electronic device 102 may include any number of other components that may not be explicitly illustrated or described for the sake of brevity.

Figure 3A:
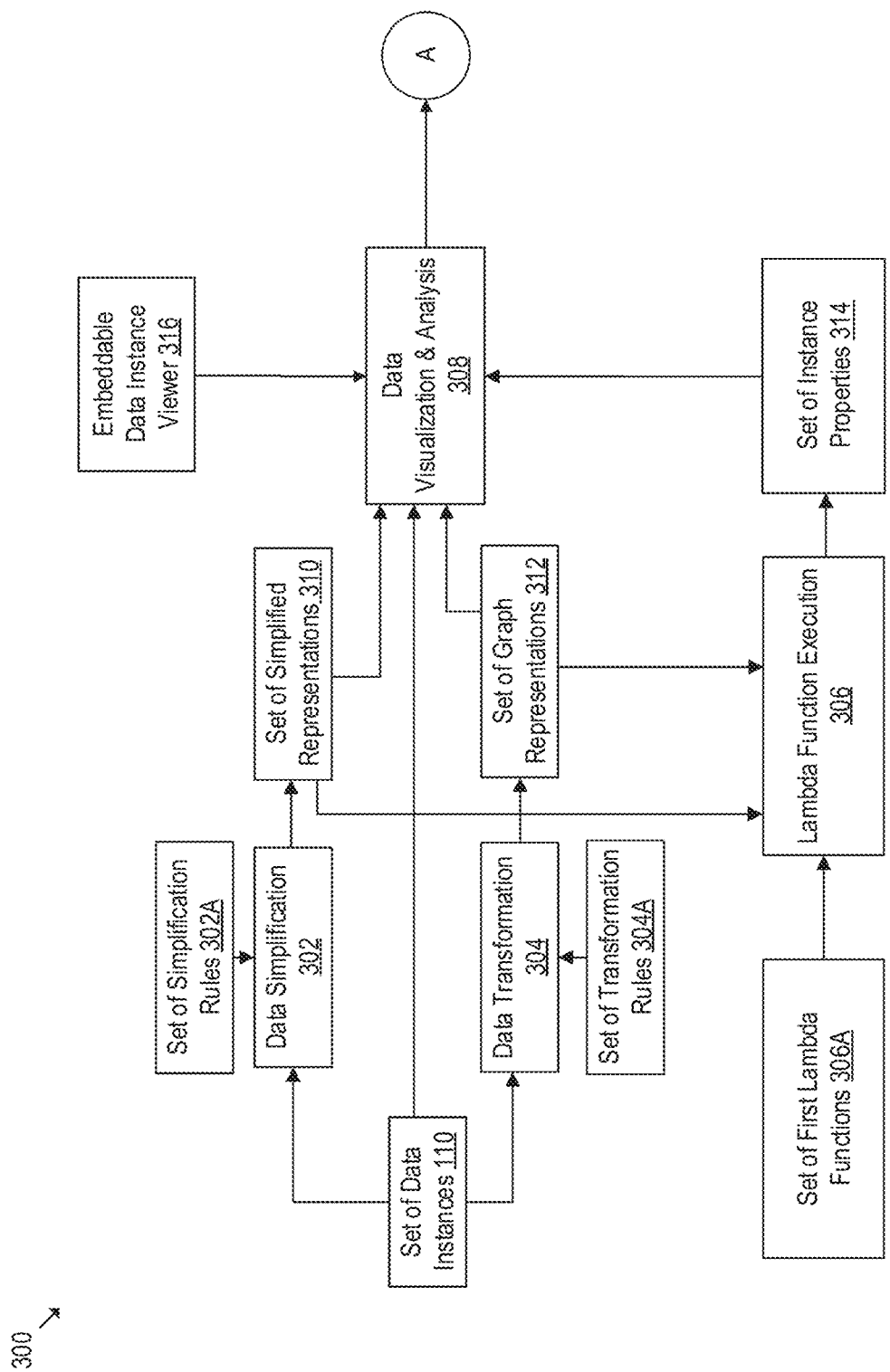
FIGS. 3A and 3B are diagrams that illustrates an execution pipeline for the task-specific graph set analysis and visualization.
Figure 3B:
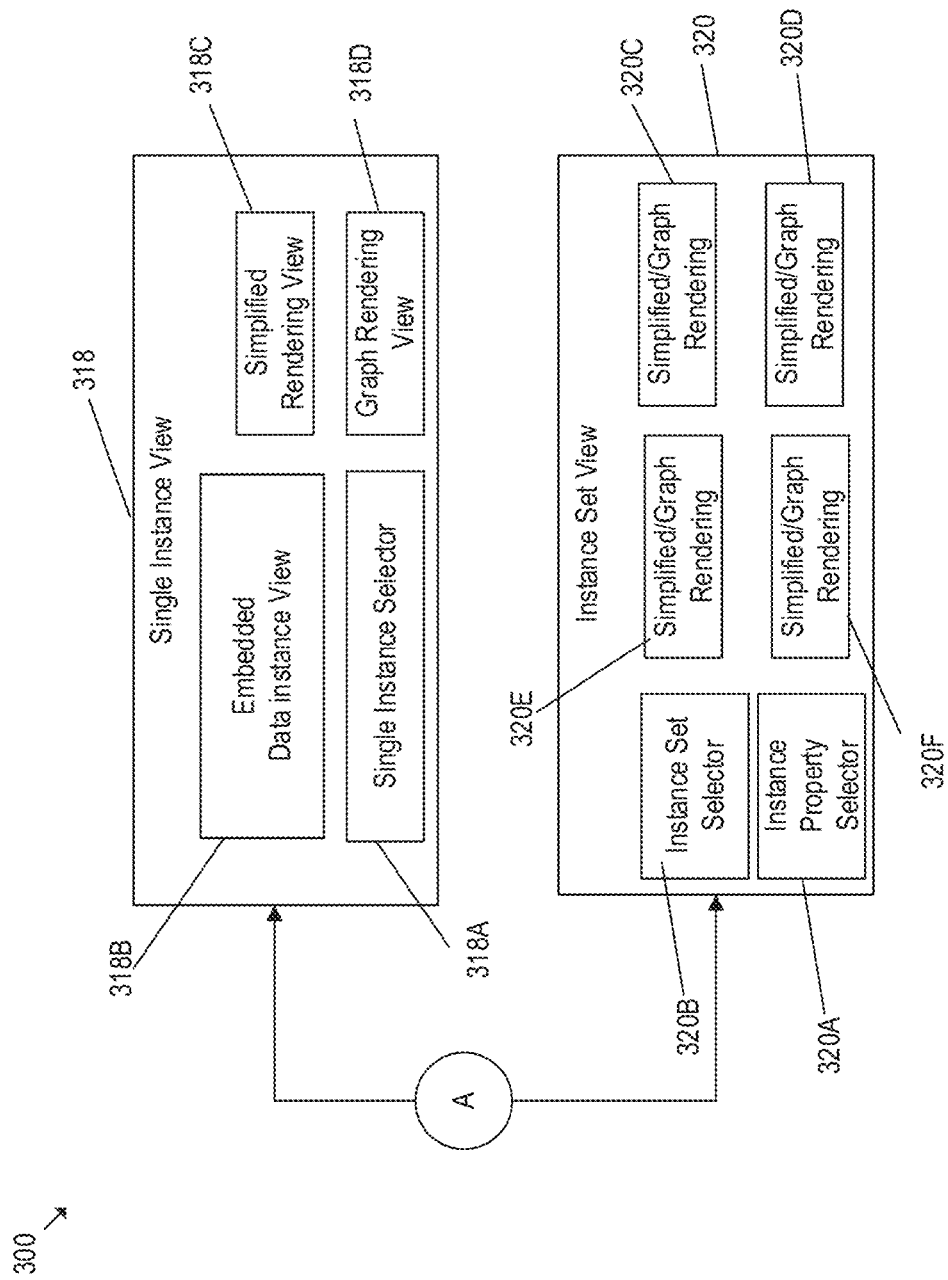

FIGS. 3A and 3B are diagrams that illustrates an execution pipeline for the task-specific graph set analysis and visualization, in accordance with an embodiment of the disclosure. FIGS. 3A and 3B are described in conjunction with elements from FIG. 1 and FIG. 2. With reference to FIGS. 3A and 3B are there is shown an execution pipeline 300. The exemplary execution pipeline 300 may include a set of operations that may be executed by one or more components of FIG. 1, such as, the electronic device 102. The operations may include a data simplification operation 302, a data transformation operation 304, a lambda function execution operation 306, and a data visualization and analysis operation 308. The set of operations may be performed by the electronic device 102 for task-specific graph set analysis and visualization, as described herein. As shown in FIG. 3A, the exemplary execution pipeline 300 may further include the set of data instances 110, a set of simplification rules 302A, a set of transformation rules 304A, a set of first lambda functions 306A, a set of simplified representations 310, a set of graph representations 312, a set of instance properties 314, and an embeddable data instance viewer 316. Further, as shown in FIG. 3B, the execution pipeline 300 may include a single instance view 318, a first user interface (UI) element 318A, an embedded data instance view 318B, a simplified rendering view 318C, a graph rendering view 318D, an instance set view 320, a second UI element 320A, a third UI element 320B, a simplified/graph rendering view 320C, a simplified/graph rendering view 320D, a simplified/graph rendering view 320E, and a simplified/graph rendering view 320F.

With reference to FIG. 3A, in an embodiment, the processor 202 may be configured to receive the set of data instances 110. Each data instance of the set of data instances 110 may be associated with a domain. The set of data instances 110 may include complex data instances that may be required to be simplified and transformed for task-specific graph set analysis and visualization of the data instances. For example, the domain associated with a data instance of the set of data instances 110 may be a textual data domain or a protein data domain. The data instances associated with textual data domain may be paragraph instances and data instances associated with protein data domain may be protein molecular structure instances.

For unified exploration and visualization of complex data instances, such as, the set of data instances 110, the set of data instances 110 may be needed to be simplified and transformed. Accordingly, the electronic device 102 may convert the set of data instances 110 into a simplified format, and a graph representation format.

At 302, an operation for data simplification may be executed. In an embodiment, the processor 202 may be configured to apply the set of simplification rules 302A on the received set of data instances 110. The processor 202 may determine the set of simplified representations 310, associated with the received set of data instances 110, based on the application of the set of simplification rules 302A. The set of simplification rules 302A to be applied on a data instance may depend on the domain on which the data instances may be associated with. The set of simplified representations 310 closely resemble the received set of data instances 110. For example, when the set of simplified representations 310 and the received set of data instances 110 are viewed side-by-side, the user 112 may directly see a resemblance as a whole in entire received set of data instances 110 (on a macro/global-level) or in a part (on a micro/local-level) of the received set of data instances 110. Details related to the determination of the set of simplified representations 310 are further, provided for example, in FIGS. 4 and 5.

At 304, an operation for data transformation may be executed. In an embodiment, the processor 202 may be configured to apply the set of transformation rules 304A on the received set of data instances 110. The processor 202 may determine the set of graph representations 312, associated with the received set of data instances 110, based on the application of the set of transformation rules 304A. It may be noted that the received set of data instances 110 may be a non-graphical dataset. Hence, the received set of data instances 110 may be converted into set of graph representations 312. In order to convert the set of data instances 110 to the set of graph representations 312, the set of transformation rules 304A may be applied. The set of transformation rules 304A may depend according to the domain of the received set of data instances 110. Upon application of the set of transformation rules 304A, the set of graph representations 312 may be determined.

The set of graph representations 312 may be a format that may be used for training of graph machine learning models and for explainable graph machine learning (GXAI) pipelines. Information provided in the received set of data instances 110 may be reduced and/or increased by augmentation in the set of graph representations 312. Such reduction and/or augmentation of the information may enhance an accuracy of a machine learning (ML) model trained on the set of graph representations 312. The set of graph representations 312 may not resemble original data instances such as, the received set of data instances 110. However, a correlation between parts of the set of graph representations 312 and the received set of data instances 110 may exist. Details related to the determination of the set of graph representations 312 are further, provided for example, in FIGS. 4 and 5.

At 306, an operation for lambda function execution may be executed. In an embodiment, the processor 202 may be configured to execute the set of first lambda functions 306A on the set of representations including the determined set of simplified representations 310 and the determined set of graph representations 312. The set of first lambda functions 306A that may be executed may depend on the domain of the received set of data instances 110. In an example, the domain associated with the received set of data instances 110 may be the textual data domain. Herein, the set of first lambda functions 306A that may be executed on the set of representations may be language-specific. In another example, the domain associated with the set of data instances 110 may be the protein data domain. Herein, the set of first lambda functions 306A that may be executed on the set of representations may be molecular-specific. Details related to the lambda function execution are further, provided for example, in FIG. 6.

In an embodiment, the processor 202 may be configured to determine the set of instance properties 314 associated with the set of representations, based on the execution of the set of first lambda functions 306A. It may be note that the set of first lambda functions 306A may be used to determine the set of instance properties 314 that may be in accordance with the domain of the set of data instances 110. Thus, the set of instance properties 314 may correspond to a set of custom instance properties. It may be appreciated that standard graph property values, such as, cycle counts, densities, and the like, may be too generic to effectively characterize the determined set of graph representations 312. The determination of the set of instance properties 314 may enable the user 112 to understand differences between the data instances visually. Moreover, the determination of the set of instance properties 314 may enable the user 112 to sort and select a subset of the received set of data instances 110 for viewing and analysis.

As discussed, the set of instance properties 314 associated with the set of representations may depend on the domain of the received set of data instances 110. In an example, the domain associated with the received set of data instances 110 may be the textual data domain. Herein, the set of instance properties 314 may be a total number of nouns, pronouns, verbs, adverbs, adjectives, and the like, present in the received set of data instances 110. In another example, the domain associated with the received set of data instances 110 may be the protein data domain. Herein, the set of instance properties 314 may be a count of molecules present in the received set of data instances 110, a number of backbone atoms present in the received set of data instances 110, a volume of the received set of data instances 110, and a length of a backbone atom present in the received set of data instances 110.

At 308, an operation for data visualization and analysis may be executed. In an embodiment, the processor 202 may be configured to analyze the set of representations, based on the determined set of instance properties 314. Based on analysis of the set of representations, the first information associated with the set of representations may be determined. The first information associated with the set of representations may be rendered on a display device, for example, the display device 208A.

In an embodiment, the processor 202 may be further configured to receive a first user input indicative of a user-selection of a view-type associated with the set of representations. The view-type may correspond to portions of the set of representations or the analysis of the set of representations that the user 112 may wish to view. Herein, the first user input indicative of the user-selection of the view-type may be received via the I/O device 208. Based on the received first user input, the first information may be determined. Thereafter, the first information may be rendered on the display device 208A.

With reference to FIG. 3B, in an embodiment, the view-type may correspond to the single instance view 318. The single instance view 318 may be a complex data visualizer that may analyze a single instance in detail. It may be noted that, opening multiple uncoordinated viewer windows for comparative analysis may be often ineffective for the user 112. Thus, the single instance view 318 may be selected to analyze the single instance in detail.

In the single instance view 318 based on a user input, a single instance may be selected and displayed on the display device 208A. In an embodiment, the single instance view 318 may include the first UI element 318A that may be configured to accept a user-selection of a single data instance from the received set of data instances 110. The single instance view 318 may include the embedded data instance view 318B that may be configured to render the user-selected single data instance. The single instance view 318 may include the simplified rendering view 318C configured to render a simplified representation associated with user-selected single data instance. The single instance view 318 may further include the graph rendering view 318D configured to render a graph representation associated with user-selected single data instance.

With reference to FIG. 3B, the first UI element 318A may be a single instance selector. In an example, the domain of the received set of data instances 110 may be the textual data domain. Further, the received set of data instances 110 comprise a set of "10" textual documents. Herein, a second textual document may be selected as the single data instance based on a user input received via the first UI element 318A. The embedded data instance view 318B may render the second textual document. The simplified representation of the second textual document may be determined based on the set of simplification rules 302A. Thereafter, the simplified rendering view 318C may render the determined simplified representation of the second textual document. The graph representation associated with the second textual document may be determined based on the set of transformation rules 304A and the graph rendering view 318D may render the determined graph representation associated with the second textual document. Thus, the single instance view 318 may display both the determined simplified representation and the determined graph representation.

In another example, the domain of the received set of data instances 110 may be the protein data domain. Further, the received set of data instances 110 comprise a set of "10" protein data sets (e.g., "10" protein molecule structures). Herein, a third protein dataset may be selected as the single data instance based on a user input received via the first UI element 318A. The embedded data instance view 318B may render the third protein dataset. The simplified representation of the third protein dataset may be determined based on the set of simplification rules 302A. Thereafter, the simplified rendering view 318C may render the determined simplified representation of third protein dataset. The graph representation associated with the third protein dataset may be determined based on the set of transformation rules 304A and the graph rendering view 318D may render the determined graph representation associated with the third protein dataset.

It may be appreciated that a domain expert such as, the user 112, may be comfortable with viewing original data such as, a data instance. Displaying the original data, such as, the data instance, the simplified representation, and the graph representation together in the single instance view 318 may enable the domain expert to understand how a machine learning model may use the received set of data instances 110.

With reference to FIG. 3B, in an embodiment, the view-type may correspond to the instance set view 320. The instance set view 320 may allow the user 112 to select sets of data instances based on instance properties. The instance set view 320 may be used to compare similar or distinct data instances.

In the instance set view 320, an instance property may be selected and displayed on the display device 208A. In an embodiment, the instance set view 320 may include the second UI element 320A that may be configured to accept a user-selection of an instance property of the determined set of instance properties. The instance set view 320 may further include the third UI element 320B that may be configured to accept a user-selection of a plurality of data instances from the received set of data instances 110. The instance set view 320 may further include a plurality of simplified rendering views, for example, the simplified/graph rendering views 320C to 320F that may be configured to render a plurality of simplified representations of the determined set of simplified representations 310. Additionally or alternatively, the instance set view 320 may include a plurality of graph rendering views, for example, the simplified/graph rendering views 320C to 320F that may be configured to render a plurality of graph representations of the determined set of graph representations 312.

With reference to FIG. 3B, in an example, the domain of the received set of data instances 110 may be the textual data domain. Further, the received set of data instances 110 comprise a textual document comprising "100" paragraphs. Herein, each paragraph may correspond to a data instance. The determined set of instance properties 314 may be a total number of nouns, a total number of pronouns, a total number of verbs, a total number of adverbs, and a total number of adjectives. The determined set of instance properties 314 may be provided as a drop down menu and the user-selection may be received. The number of nouns may be selected as a selected instance property based on the user-selection received via the user input provided in the second UI element 320A. A first paragraph to a fourth paragraph may be selected as the plurality of data instances from the received set of data instances 110 based on the user-selection received via the third UI element 320B. The set of simplified representations associated with the first paragraph to the fourth paragraph may be rendered via the plurality of simplified rendering views for example, the simplified/graph rendering views 320C to 320F. In some cases, instead of rendering the set of simplified representations associated with the first paragraph to the fourth paragraph, the set of graph representations 312 associated with the first paragraph to the fourth paragraph may be rendered via the plurality of graph rendering views, for example, the simplified/graph rendering views 320C to 320F. Thus, at a time instant, the instance set view 320 may display either the determined set of simplified representations associated with the first paragraph to the fourth paragraph, or the determined set of graph representations associated with the first paragraph to the fourth paragraph.

In an embodiment, the processor 202 may be configured to receive a second user input indicative of a user-selection of at least one of an instance property of the determined set of instance properties, a simplified representation of the determined set of simplified representations 310, or a graph representation of the determined set of graph representations 312. The processor 202 may be configured to determine the first information based on the received second user input. Herein, the second user input may be received via the I/O device 208. In an example, based on the second user input, the instance property, such as, nouns present in a parse tree (in case of a text domain corresponding to a set of paragraphs in a language), may be selected. The selected instance property may be determined as the first information. The selected instance property, such as, the nouns in the parse tree, may be then displayed. In another example, one simplified representation of the determined set of simplified representations may be selected based on the received second user input. The selected simplified representation may be determined as the first information and displayed. In another example, one graph representation, such as, a first parse tree of the determined set of graph representations 312 may be selected based on the received second user input. The selected graph representation such as, the first parse tree, may be determined as the first information and may be displayed on the display device 208A.

Thus, the disclosed electronic device 102 may have an ability to use a same framework for visualizing and analyzing the received set of data instances 110 of different domains. The received set of data instances 110 of different domains may be transformed to the set of graphs representations 312. The set of graphs representations 312 may be used in graph machine learning. Further, for each domain transformation, methods to obtain the set of graphs representations 312 may be different. Such incorporation of task-specific simplification and transformation techniques may enable the disclosed electronic device 102 to use a same methodology and a same user interface for a variety of data types, such as, a protein data and a language data. Moreover, the disclosed electronic device 102 may visualize and analyze multiple of instances of the received set of data instances 110 side-by-side. Further, the disclosed electronic device 102 may allow a switching between the simplified representation and graph representation on the electronic UI.

Figure 4:
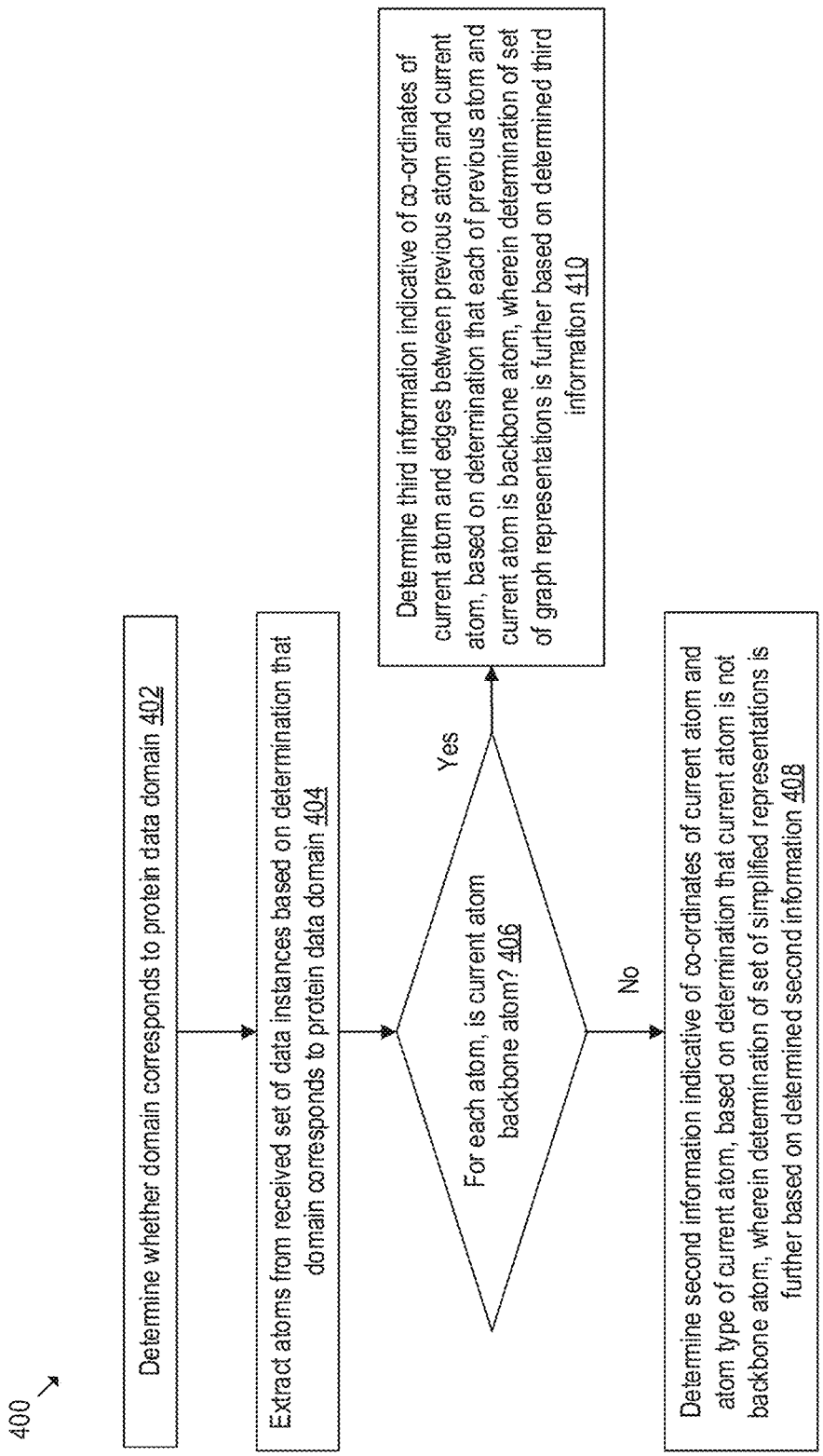
FIG. 4 is a diagram that illustrates a flowchart of an example method for determination of second information and third information.

FIG. 4 is a diagram that illustrates a flowchart of an example method for determination of second information and third information, in accordance with an embodiment of the disclosure. FIG. 4 is described in conjunction with elements from FIG. 1, FIG. 2, FIG. 3A, and FIG. 3B. With reference to FIG. 4, there is shown a flowchart 400. The method illustrated in the flowchart 400 may start at 402 and may be performed by any suitable system, apparatus, or device, such as, by the example electronic device 102 of FIG. 1, or the processor 202 of FIG. 2. Although illustrated with discrete blocks, the steps and operations associated with one or more of the blocks of the flowchart 400 may be divided into additional blocks, combined into fewer blocks, or eliminated, depending on the particular implementation.

At block 402, a check may be performed to determine whether the domain corresponds to the protein data domain. In an embodiment, the processor 202 may be configured to determine whether the domain corresponds to the protein data domain. It may be appreciated that the protein data domain may be also referred to as a molecular data domain. Protein data may include a plurality of atoms, such as, Carbon atoms, Hydrogen atoms, Oxygen atoms, Nitrogen atoms, and Sulfur atoms (and various organic and inorganic atoms and compounds). Each atom of the plurality of atoms may be connected to one or more other atoms of the plurality of atoms via one or more bonds. The processor 202 may analyze the received set of data instances 110 to determine whether domain of the received set of data instances 110 is the protein data domain.

At block 404, atoms from the received set of data instances 110 may be extracted based on the determination that the domain corresponds to the protein data domain. In an embodiment, the processor 202 may be configured to extract atoms from the received set of data instances 110 based on the determination that the domain corresponds to the protein data domain. The received set of data instances 110 may include the plurality of atoms. The processor 202 may process the received set of data instances 110 to extract the atoms from each data instance. In an example, the received set of data instances 110 may include the plurality of atoms comprising the Carbon atoms, Hydrogen atoms, Oxygen atoms, Nitrogen atoms, and Sulfur atoms (and various organic and inorganic atoms and compounds). The plurality of atoms may be extracted from the received set of data instances 110.

At block 406, a check may be performed to determine, for each atom, whether a current atom is a backbone atom. In an embodiment, the processor 202 may be configured to determine, for each atom, whether the current atom is the backbone atom. It may be appreciated that a backbone atom may be an atom that may be connected to two or more atoms such that the backbone atom is a main atom (or one of the main atoms) of a molecule. For example, a sequence of a Nitrogen atom, an Alpha-Carbon atom, and a Carbon atom may form a backbone structure. For instance, the Nitrogen atom may form a bond with the Alpha-Carbon atom and the Alpha-Carbon atom may form a bond with the Carbon atom. Thus, the Alpha-Carbon atom may be the backbone atom. Each atom may be analyzed to determine whether the current atom is the backbone atom. In case, the current atom is not the backbone atom, then the control may pass to block 408. In case, the current atom is the backbone atom, control may pass to block 410.

At block 408, for each atom, second information, indicative of co-ordinates of the current atom and an atom type of the current atom, may be determined based on the determination that the current atom is not be the backbone atom. In an embodiment, the processor 202 may be configured to determine the second information indicative of co-ordinates of the current atom and the atom type of the current atom, based on the determination that the current atom is not be backbone atom, wherein the determination of the set of simplified representations 310 may be further based on the determined second information. In an example, the atom type may indicate a name of the atom. For example, the current atom may be analyzed to determine whether the current atom is the Carbon atom, the Hydrogen atom, the Oxygen atom, the Nitrogen atom, or the Sulfur atom. Moreover, the current atom may be associated with certain co-ordinates. The second information indicative of the co-ordinates of the current atom may be determined. In an example, Angstrom coordinate of the current atom may be determined. Herein, the second information may include an "X" orthogonal Angstrom coordinate, a "Y" orthogonal Angstrom coordinate, and a "Z" orthogonal Angstrom coordinate of the current atom. Similarly, second information of other atoms may be determined. Based on the determined second information, the set of simplified representations 310 may be determined.

As discussed, in case, the current atom is the backbone atom, then control may pass to block 410. At block 410, third information, indicative of co-ordinates of the current atom and edges between a previous atom and the current atom, may be determined based on the determination that each of the previous atom and the current atom may be the backbone atom. In an embodiment, the processor 202 may be configured to determine third information indicative of co-ordinates of the current atom and edges between a previous atom and the current atom, based on the determination that each of the previous atom and the current atom may be the backbone atom, wherein the determination of the set of graph representations 312 may be further based on the determined third information. As discussed, the backbone atom may be an atom that may be connected to at least two other atoms. In an example, an Alpha-Carbon atom may be the current atom. A Nitrogen atom may form one or more bonds with the Alpha-Carbon atom. Herein, the Nitrogen atom may be the previous atom. A number of edges and a type of edges that may exist between the Nitrogen atom and the Alpha-Carbon atom may be determined. Further, the Angstrom coordinates of the Alpha-Carbon atom may be determined. That is, the "X" orthogonal Angstrom coordinate, the "Y" orthogonal Angstrom coordinate, and the "Z" orthogonal Angstrom coordinate of the Alpha-Carbon atom may be determined. The third information may indicate the number of edges and the type of edges that may exist between the previous Alpha-Carbon atom and the current Alpha-Carbon atom. Further, the third information may indicate Angstrom coordinates of the alpha-carbon atom. Based on the determined third information, the set of graph representations 312 may be determined. That is, based on the number of edges and the type of edges that may exist between the Nitrogen atom and the Alpha-Carbon atom, the determined "X" orthogonal Angstrom coordinate, the determined "Y" orthogonal Angstrom coordinate, and the determined "Z" orthogonal Angstrom coordinate of the alpha-carbon atom, one or more graphs may be generated. Control may pass to end.

Although the flowchart 400 is illustrated as discrete operations, such as 402, 404, 406, 408, and 410. However, in certain embodiments, such discrete operations may be further divided into additional operations, combined into fewer operations, or eliminated, depending on the particular implementation without detracting from the essence of the disclosed embodiments.

Figure 5:
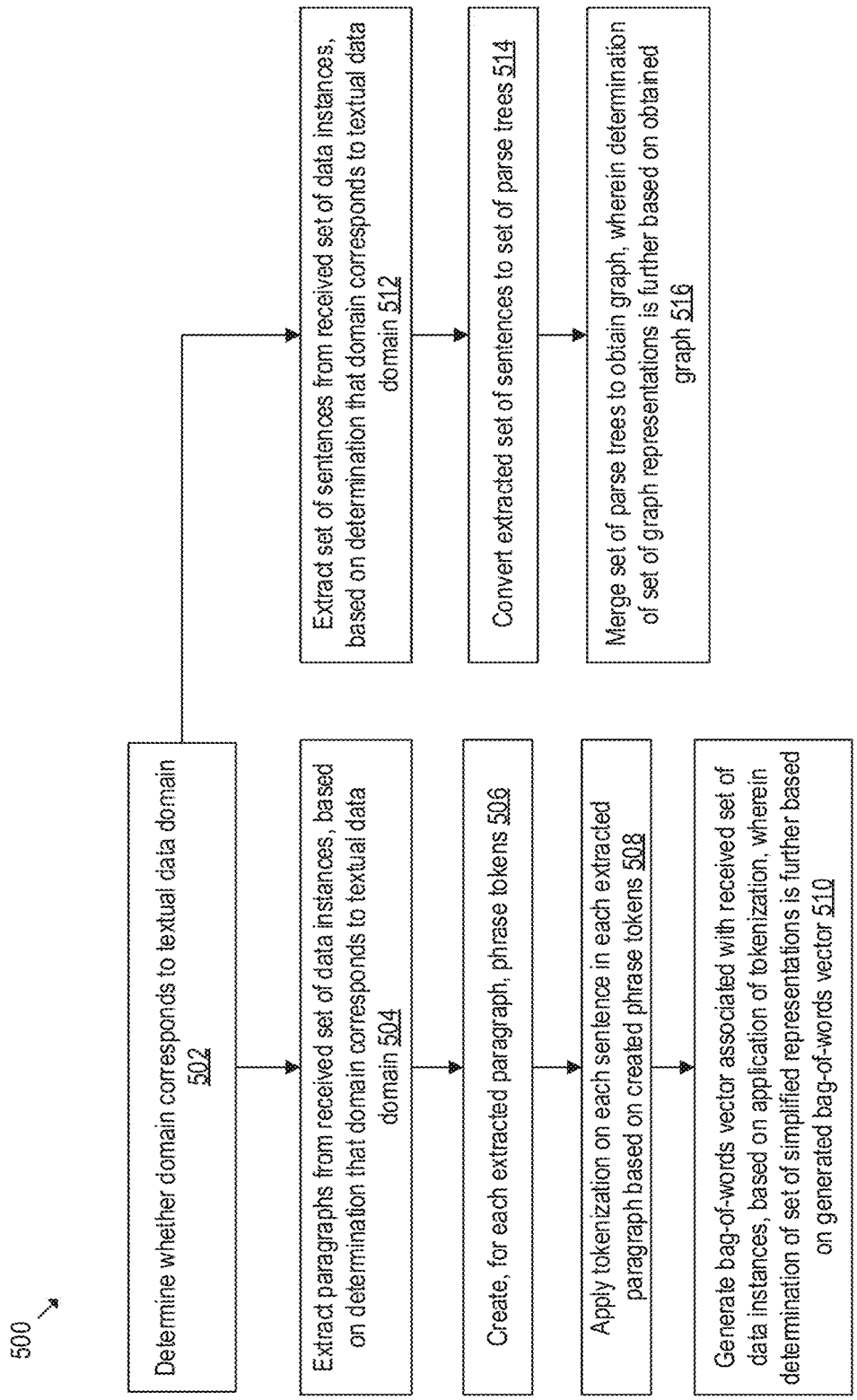
FIG. 5 is a diagram that illustrates a flowchart of an example method for generation of a bag-of-words vector.

FIG. 5 is a diagram that illustrates a flowchart of an example method for generation of a bag-of-words vector, in accordance with an embodiment of the disclosure. FIG. 5 is described in conjunction with elements from FIG. 1, FIG. 2, FIG. 3A, FIG. 3B, and FIG. 4. With reference to FIG. 5, there is shown a flowchart 500. The method illustrated in the flowchart 500 may start at 502 and may be performed by any suitable system, apparatus, or device, such as, by the example electronic device 102 of FIG. 1, or the processor 202 of FIG. 2. Although illustrated with discrete blocks, the steps and operations associated with one or more of the blocks of the flowchart 500 may be divided into additional blocks, combined into fewer blocks, or eliminated, depending on the particular implementation.

At block 502, whether the domain corresponds to the textual data domain may be determined. In an embodiment, the processor 202 may be configured to determine whether the domain corresponds to the textual data domain. Textual data may include a plurality of words, sentences, paragraphs, or documents. The processor 202 may analyze the received set of data instances 110 to determine whether domain of the received set of data instances 110 is the textual data domain.

At block 504, paragraphs may be extracted from the received set of data instances 110, based on the determination that the domain corresponds to the textual data domain. In an embodiment, the processor 202 may be configured to extract the paragraphs from the received set of data instances 110, based on the determination that the domain corresponds to the textual data domain. It may be appreciated that the textual data may include a plurality of paragraphs. For example, the received set of data instances 110 may include "150" paragraphs. In such case, an analysis of the received set of data instances 110 as a whole may be complex and time consuming. Therefore, the plurality of paragraphs may be identified and extracted from the received set of data instances 110.

At block 506, for each extracted paragraph, phrase tokens may be created. In an embodiment, the processor 202 may be configured to create, for each extracted paragraph, phrase tokens. In an embodiment, the phrase tokens may be smallest words such as, articles, nouns, pronouns, and the like. Each extracted paragraph may be analyzed to create the articles, the nouns, the pronouns, for example, as the phrase tokens. In an example, the phrase tokens for a first paragraph may be created as "a", "an", "the", "he", "she", "they", "Joseph", and "Mary". The phrase tokens for a second paragraph may be created as "a", "an", "table", "do", "did", "Mark", and "Mathew".

At block 508, tokenization may be applied on each sentence in each extracted paragraph based on the created phrase tokens. In an embodiment, the processor 202 may be configured to apply tokenization on each sentence in each extracted paragraph based on the created phrase tokens. It may be appreciated that each sentence in each extracted paragraph may include a plurality of words. In an embodiment, each word of a sentence may be extracted based on application of tokenization on the corresponding sentence. In an embodiment, each word of a sentence may be extracted. Thereafter, tokenization may be applied on the corresponding sentence. Based on the application of the tokenization, certain created phrase tokens may be removed from the corresponding sentence. In an example, a first sentence in a first paragraph may be "John is travelling to Washington on 20$^{th}$ August by flight". The phrase tokens for the first paragraph may be created as "a", "an", "the", "is", "she", "they", "John", and "Mary". The tokenization may be applied on the first sentence of the first paragraph based on created phrase tokens. Based on application of tokenization of the first sentence of the first paragraph, "is" and "John" may be removed.

At block 510, a bag-of-words vector associated with the received set of data instances 110 may be generated, based on the application of the tokenization, wherein the determination of the set of simplified representations 310 may be further based on the generated bag-of-words vector. In an embodiment, the processor 202 may be configured to generate the bag-of-words vector associated with the received set of data instances 110, based on the application of the tokenization, wherein the determination of the set of simplified representations 310 may be further based on the generated bag-of-words vector. In an example, the received set of data instances 110 may include "5" paragraphs. A first paragraph may include "5" sentences, a second paragraph may include "10" sentences, a third paragraph may include "8" sentences, a fourth paragraph may include "7" sentences, and a fifth paragraph may include "6" sentences. A vocabulary for the received set of data instances 110 may be determined. A number of distinct words used in the received set of data instances 110 may be "300", for example. In an example, a total number of words in the received set of data instances 110 may be "1000". Therefore, for each sentence a vector of size "1" row and "300" columns may be created. Thus, the vector may include "300" entities arranges in "1" row and "300" columns. Each entity may be associated with a word. If the word associated with an entity is present in a sentence, then a value of the corresponding entity may be "1". If the word associated with the entity is not present in the sentence, then the value of the corresponding entity may be "0". A first bag-of-words vector associated with the first paragraph may be generated by combining vectors associated with each sentence of the first paragraph. Since, the first paragraph may include "5" sentences, the size of the generated first bag-of-words vector may be "5" rows and "300" columns, wherein each row may be associated with a sentence and each column may be associated with a word. Based on the generated first bag-of-words vector, the set of simplified representations 310 may be determined.

At block 512, a set of sentences may be extracted from the received set of data instances 110, based on the determination that the domain corresponds to the textual data domain. In an embodiment, the processor 202 may be configured to extract the set of sentences from the received set of data instances 110, based on the determination that the domain corresponds to the textual data domain. In an example, the received set of data instances 110 may include "400" sentences. Herein, each sentence may be extracted from the received set of data instances 110 based on sentence extraction techniques. In an embodiment, a sentence extractor may be employed to extract the set of sentences. The sentence extractor may look for a terminator such a full stop "." to extract a sentence.

At block 514, the extracted set of sentences may be converted to a set of parse trees. In an embodiment, the processor 202 may be configured to convert the extracted set of sentences to the set of parse trees. It may be appreciated that a parse tree may be also referred to as a syntax tree. The parse tree may represent a plurality of words of a sentence in a form of the tree. The parse tree may be determined based on different syntax categories of the sentences, based on a grammar (such as, parts-of-speech) of the language. Each sentence of the extracted set of sentences may be converted to the parse tree in order to determine the set of parse trees.

At block 516, the set of parse trees may be merged to obtain a graph. In an embodiment, the processor 202 may be configured to merge the set of parse trees to obtain a graph, wherein the determination of the set of graph representations 312 may be further based on the obtained graph. In an example, the received set of data instances 110 may include "320" sentences. The processor 202 may determine a parse tree for each sentence. Thus, the set of parse trees determined for the "320" sentences may include "320" parse trees. The "320" parse trees may be merged to obtain the graph. Based on the obtained graph, the set of graph representations 312 may be determined. Control may pass to end.

Figure 6:
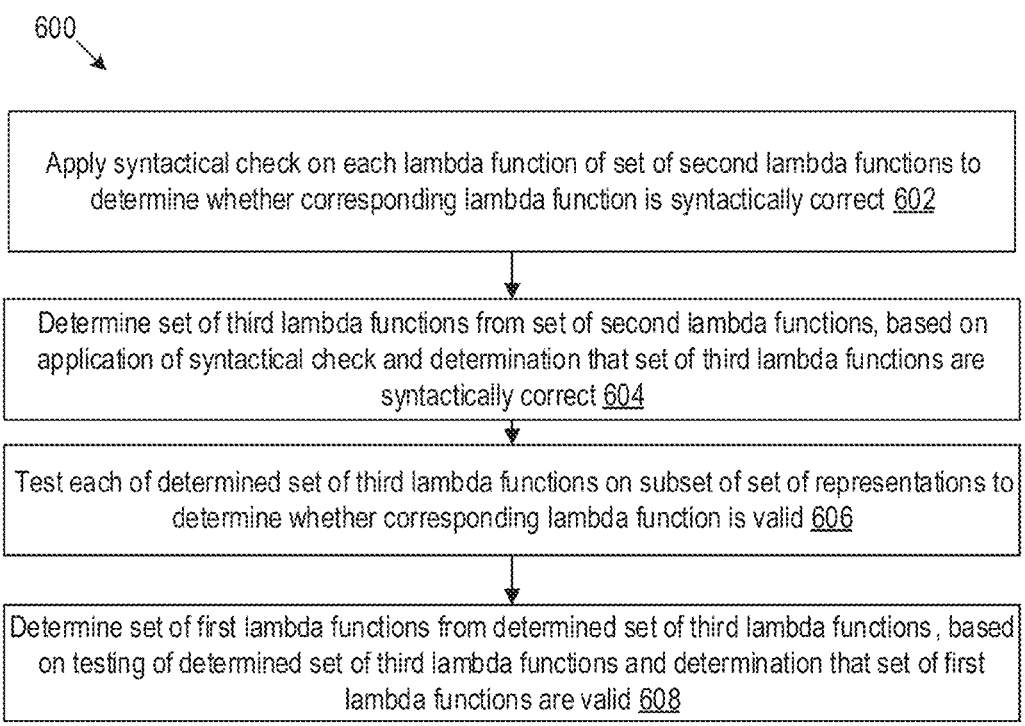
FIG. 6 is a diagram that illustrates a flowchart of an example method for determination of a set of first lambda functions.

Although the flowchart 500 is illustrated as discrete operations, such as 502, 504, 506, 508, 510, 512, 514, and 516. However, in certain embodiments, such discrete operations may be further divided into additional operations, combined into fewer operations, or eliminated, depending on the particular implementation without detracting from the essence of the disclosed embodiments FIG. 6 is a diagram that illustrates a flowchart of an example method for determination of a set of first lambda functions, in accordance with an embodiment of the disclosure. FIG. 6 is described in conjunction with elements from FIG. 1, FIG. 2, FIG. 3A, FIG. 3B, FIG. 4, and FIG. 5. With reference to FIG. 6, there is shown a flowchart 600. The method illustrated in the flowchart 600 may start at 602 and may be performed by any suitable system, apparatus, or device, such as, by the example electronic device 102 of FIG. 1, or the processor 202 of FIG. 2. Although illustrated with discrete blocks, the steps and operations associated with one or more of the blocks of the flowchart 600 may be divided into additional blocks, combined into fewer blocks, or eliminated, depending on the particular implementation.

At 602, a syntactical check may be applied on each lambda function of a set of second lambda functions to determine whether the corresponding lambda function is syntactically correct. In an embodiment, the processor 202 may be configured to apply the syntactical check on each lambda function of the set of second lambda functions to determine whether the corresponding lambda function is syntactically correct. The set of second lambda functions may be lambda functions that may be available in a database. It may be appreciated that each lambda function may have a proper syntax that may need to be followed in order to apply the corresponding lambda function on the set of representations. The syntactical check may be used to determine whether a syntax of each second lambda function of the set of second lambda functions is correct. For example, in case of Python, a syntax checker such as "PyChecker" may be used for the syntactical check.

At 604, the set of third lambda functions may be determined from the set of second lambda functions, based on the application of the syntactical check and a determination that the set of third lambda functions are syntactically correct. In an embodiment, the processor 202 may be configured to determine a set of third lambda functions from the set of second lambda functions, based on the application of the syntactical check and the determination that the set of third lambda functions are syntactically correct. The syntactical check may be applied on each second lambda function of the set of second lambda functions to determine whether a syntax the corresponding second lambda function is correct. In case the syntax of a second lambda function is correct, then the corresponding second lambda function may be added to the set of third lambda functions. Thus, the set of third lambda functions may include one or more second lambda functions of the set of second lambda functions that are syntactically correct. In other words, the set of third lambda functions may be a subset of the set of second lambda functions that may be syntactically correct.

At 606, each of the determined set of third lambda functions may be tested on a subset of the set of representations to determine whether the corresponding lambda function is valid. In an embodiment, the processor 202 may be configured to test each of the determined set of third lambda functions on the subset of the set of representations to determine whether the corresponding lambda function is valid. In an embodiment, each third lambda function of the determined set of third lambda functions may be applied on the subset of the set of representations. The subset of the set of representations may be samples of the set of representations on which the determined set of third lambda functions may be tested. For example, a third lambda function associated with the textual data domain may be "glambda_descriptive( )". Herein, the "glambda_descriptive( )" may be a lambda function that may be defined to determine a number of nouns, a number of pronouns, a number of adjectives, and a number of adverbs of a parse tree. The "glambda_descriptive( )" may be executed on a parse tree to determine whether the "glambda_descriptive( )" is valid or not. In case, the "glambda_descriptive( )" is valid, then the execution of the "glambda_descriptive( )" on the parse tree may provide the number of nouns, the number of pronouns, the number of adjectives, and the number of adverbs of the corresponding parse tree. In case, the "glambda_descriptive( )" is invalid, then the execution of the "glambda_descriptive( )" on the parse tree may fail.

At 608, the set of first lambda functions 306A may be determined from the determined set of third lambda functions, based on the testing of the determined set of third lambda functions and a determination that the set of first lambda functions are valid. In an embodiment, the processor 202 may be configured to determine the set of first lambda functions 306A from the determined set of third lambda functions, based on the testing of the determined set of third lambda functions and the determination that the set of first lambda functions are valid. The set of first lambda functions may be a subset of the set of third lambda functions that may be valid lambda functions. Herein, one or more third lambda functions of the determined set of third lambda functions that may have been tested successfully may be determined as the set of first lambda functions 306A. In an example, the third lambda function associated with the textual data domain may be the "glambda_descriptive( )". The "glambda_descriptive( )" may be successfully tested on the parse tree. Thus, the "glambda_descriptive( )" may be included in the set of first lambda functions 306A. The set of first lambda functions may be applied to each of the set of representations.

In an embodiment, the processor 202 may be further configured to create a first sampled reductions associated with the set of simplified representations 310. It may be noted that as the received set of data instances 110 may be complex data, the set of simplified representations 310 determined from the received set of data instances 110 may also be large in number or include many nodes. Therefore, the testing of determined set of third lambda functions on the set of simplified representations 310 may take a considerable amount of time. In order to reduce a testing time duration, the set of simplified representations 310 may be sampled down to create the first sampled reductions. For example, the set of simplified representations 310 may be sampled down by "32" samples to create the created first sampled reductions.

In an embodiment, the processor 202 may be further configured to create a second sampled reductions associated with the set of graph representations 312. It may be noted that as the received set of data instances 110 may be complex data, set of graph representations 312 determined from the received set of data instances 110 may also be large in number or include many nodes. Therefore, the testing of determined set of third lambda functions on the set of graph representations 312 may take a considerable amount of time. In order to reduce a testing time duration, the set of graph representations 312 may be sampled down to create the second sampled reductions. For example, the set of graph representations 312 may be sampled down by "22" samples to create the created second sampled reductions.

In an embodiment, the processor 202 may be further configured to apply a test run of the determined set of third lambda functions on each of the created first sampled reductions and the created second sampled reductions. The determined set of third lambda functions may be tested on the created first sampled reductions and the created second sampled reductions. Since a size of the created first sampled reductions and the created second sampled reductions is lesser than a size of the entire set of simplified representations 310 and the set of graph representations 312, the testing time for the determined set of third lambda functions may reduce.

In an embodiment, the processor 202 may be further configured to determine, for each of the determined set of third lambda functions, whether the applied test run completes within a predefined time. The determination of the set of first lambda functions 306A may be further based on a determination that, for each of the set of first lambda functions 306A, the applied test run completes within the predefined time. The determined set of third lambda functions may be executed on each of the created first sampled reductions and the created second sampled reductions. Thereafter, a subset of the determined set of third lambda functions that may be successfully executed within the predefined time may be determined as the set of first lambda functions 306A. Thus, during the testing of the determined set of third lambda functions a time limit check and a completion check may be used to determine the set of first lambda functions 306A. Control may pass to end.

Although the flowchart 600 is illustrated as discrete operations, such as 602, 604, 606, and 608. However, in certain embodiments, such discrete operations may be further divided into additional operations, combined into fewer operations, or eliminated, depending on the particular implementation without detracting from the essence of the disclosed embodiments.

Figure 7:
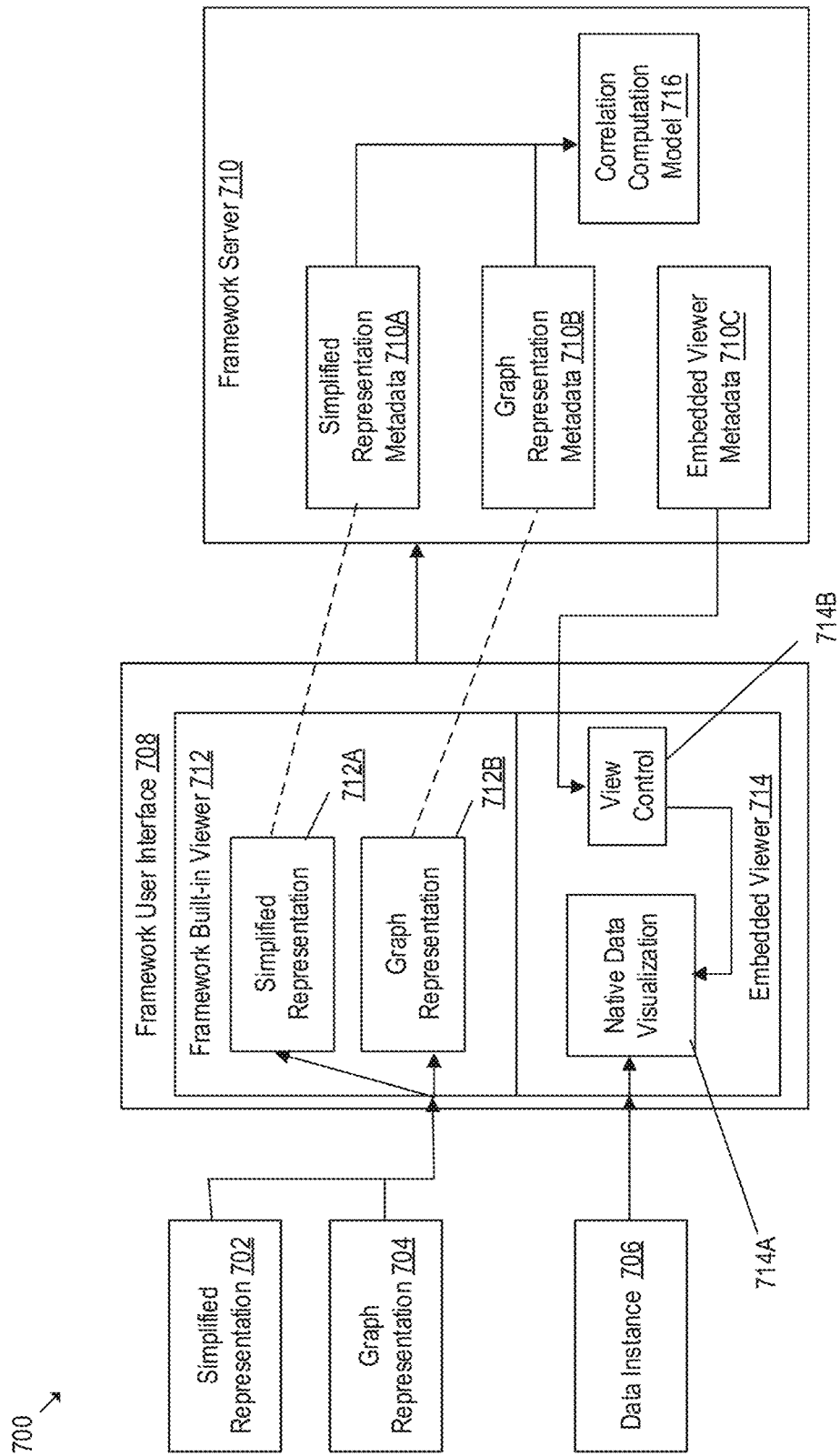
FIG. 7 is a diagram that illustrates an exemplary scenario for an electronic user interface (UI) to display first information.

FIG. 7 is a diagram that illustrates an exemplary scenario for an electronic user interface (UI) to display first information, in accordance with at least one embodiment described in the present disclosure. FIG. 7 is described in conjunction with elements from FIG. 1, FIG. 2, FIG. 3A, FIG. 3B, FIG. 4, FIG. 5, and FIG. 6. With reference to FIG. 7, there is shown an exemplary scenario 700. The exemplary scenario 700 may include a simplified representation 702, a graph representation 704, a data instance 706, a framework UI 708, and a framework server 710. The framework UI 708 may include a framework built-in viewer 712 and an embedded viewer 714. The framework server 710 may include simplified representation metadata 710A, graph representation metadata 710B, and embedded viewer metadata 710C. The framework built-in viewer 712 may include a UI element 712A and a UI element 712B. The embedded viewer 714 may include a UI element 714A and a view control 714B. The framework server 710 may further include a correlation computation model 716. A set of operations associated with the scenario 700 is described herein.

With reference to the scenario 700, the framework server 710 may determine the simplified representation 702 and the graph representation 704 for the data instance 706. The framework server 710 may store the simplified representation metadata 710A and the graph representation metadata 710B. Herein, the simplified representation metadata 710A and the graph representation metadata 710B may correspond to the metadata associated with the determined simplified representation 702 and the determined graph representation 704. Thereafter, the framework server 710 may use a correlation computation model 716 to determine a correlation between the determined simplified representation 702 and the determined graph representation 704 by computing the correlation between the simplified representation metadata 710A and the graph representation metadata 710B. Based on determination of correlation, the framework server 710 may determine the embedded viewer metadata 710C.

With reference to FIG. 7, the framework built-in viewer 712 and the embedded viewer 714 may be rendered on the display device 208A of the electronic device 102. The framework UI 708 may be the electronic user interface (UI) that may be used to display the determined simplified representation 702 and the determined graph representation 704. The UI element 712A may display the simplified representation 702. The UI element 712B may display the graph representation 704. In some embodiments, the first user input indicative of the user-selection of the view-type associated with the set of representations may be received. Based on the user-selection of the view-type, the first information may be determined. The first information may be rendered on the display device 208A of the electronic device 102.

In order to keep the embedded viewer 714 in sync with the framework built-in viewer 712, an application programming interface (API) such as, the view control 714B associated with the embedded viewer 714 may be controlled. The framework server 710 may computes changes that may need to be transmitted to the API associated with the embedded viewer 714 so that the embedded viewer 714 may be in sync with the framework built-in viewer 712, based on the determined embedded viewer metadata 710C. The embedded viewer metadata 710C may be then sent to the view control 714B of the embedded viewer 714. It may be noted that an architecture of a framework client-server may not need to be changed in order to update the embedded viewer metadata 710C. With reference to FIG. 7, based on the user-selection of the view-type, the data instance 706, and the embedded viewer metadata 710C, the UI element 714A may provide a visualization of native data such as, the data instance 706. In some embodiments, the operations of the framework server 710 may be executed by the processor 202 of the electronic device 102. Further, the operations associated with the electronic device 102 may be executed by the framework server 710.

It should be noted that the scenario 700 of FIG. 7 is merely an example and such an example should not be construed as limiting the scope of disclosure.

Figure 8:
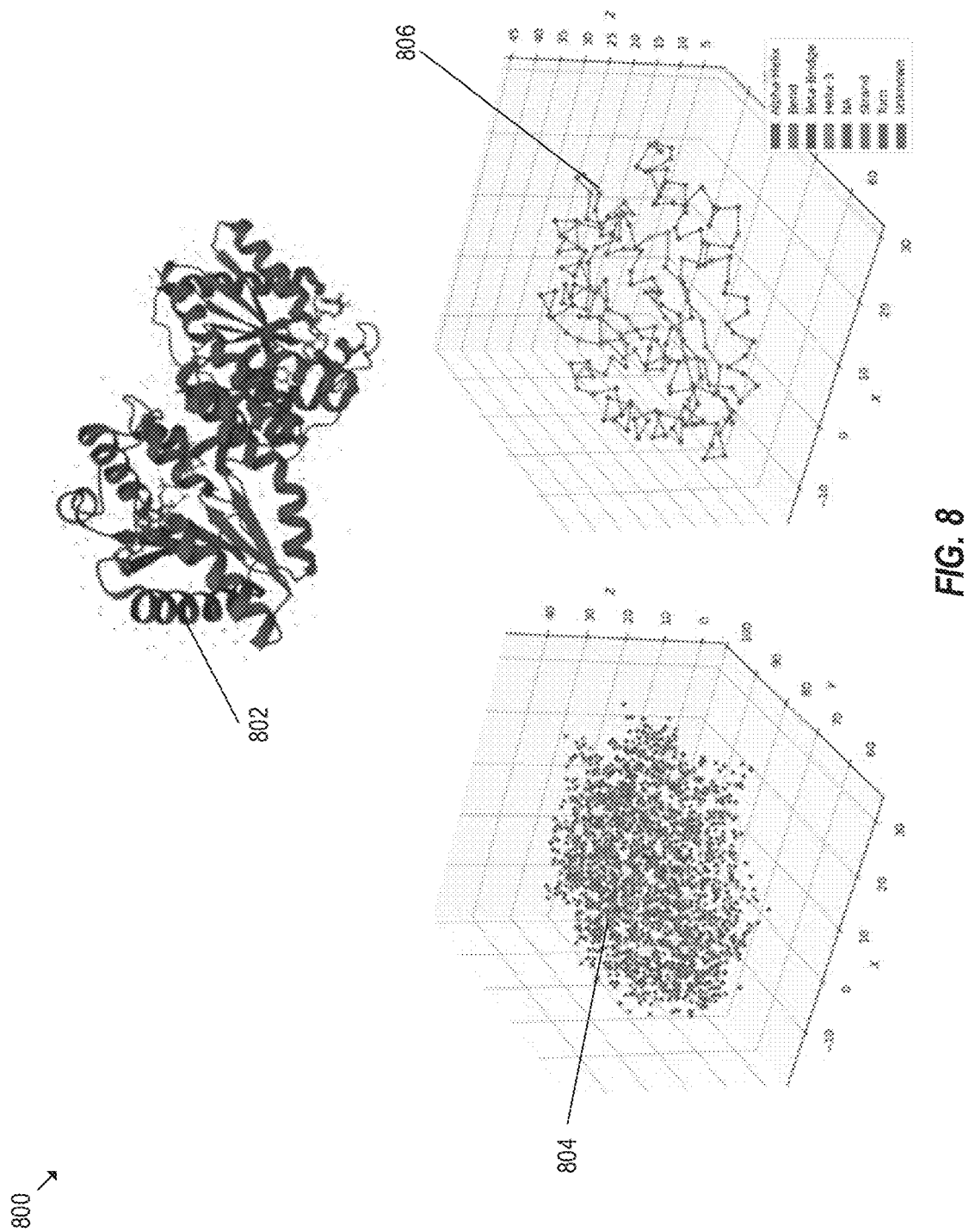
FIG. 8 is a diagram that illustrates an exemplary scenario of single instance view.

FIG. 8 is a diagram that illustrates an exemplary scenario of single instance view, in accordance with at least one embodiment described in the present disclosure. FIG. 8 is described in conjunction with elements from FIG. 1, FIG. 2, FIG. 3A, FIG. 3B, FIG. 4, FIG. 5, FIG. 6, and FIG. 7. With reference to FIG. 8, there is shown an exemplary scenario 800. The exemplary scenario 800 may include a UI element 802, a UI element 804, and a UI element 806. A set of operations associated with the scenario 800 is described herein.

With reference to the scenario 800, the UI element 802 may illustrate a data instance of the protein data domain. The processor 202 may determine a simplified representation and a graph representation of the data instance. The UI element 804 may display the simplified representation of the data instance. The UI element 806 may display the graph representation of the data instance. Thus, the user 112 may view the data instance, the simplified representation, and the graph representation at once. Such display of the data instance, the simplified representation, and the graph representation, may facilitate the user 112 in deriving insights from the data instance, the simplified representation, and the graph representation.

It should be noted that the scenario 800 of FIG. 8 is merely an example and such an example should not be construed as limiting the scope of disclosure.

FIG. 9A is a diagram that illustrates an exemplary scenario for executing a set of first lambda functions on a set of representations associated with textual data, in accordance with at least one embodiment described in the present disclosure FIG. 9A is described in conjunction with elements from FIG. 1, FIG. 2, FIG. 3A, FIG. 3B, FIG. 4, FIG. 5, FIG. 6, FIG. 7, and FIG. 8. With reference to FIG. 9A, there is shown an exemplary scenario 900A. The exemplary scenario 900A may include a pipeline 902. The pipeline 902 may include a set of codes 902A and a set of codes 902B. A set of operations associated with the scenario 900A is described herein.

With reference to FIG. 9A, the pipeline 902 may include the set of codes 902A and the set of codes 902B. The set of codes 902A may define a lambda function named as "glambda_convoluted( )" and a lambda function named as "glambda_descriptive( )". The "glambda_convoluted( )" may be the lambda function that may determine a parameter associated with a length and a height of a tree associated with textual data. Herein, the tree may be a parse tree of the textual data. The "glambda_descriptive( )" may be the lambda function that may determine a parameter associated with a length of adjectives, a length of adverbs, a length of nouns, a length of pronouns and a length of verbs present in the tree associated with textual data. The set of codes 902A may print an output obtained based on execution of the "glambda_convoluted( )" and an output obtained based on execution of the "glambda_descriptive( )".

It should be noted that the scenario 900A of FIG. 9A is an example and such an example should not be construed to limit the scope of the disclosure.

FIG. 9B is a diagram that illustrates an exemplary scenario for executing a set of first lambda functions on a set of representations associated with protein data, in accordance with at least one embodiment described in the present disclosure. FIG. 9B is described in conjunction with elements from FIG. 1, FIG. 2, FIG. 3A, FIG. 3B, FIG. 4, FIG. 5, FIG. 6, FIG. 7, FIG. 8, and FIG. 9A. With reference to FIG. 9B, there is shown an exemplary scenario 900B. The exemplary scenario 900B may include a pipeline 904. The pipeline 904 may include a set of codes 904A. A set of operations associated with the scenario 900B is described herein.

With reference to FIG. 9B, the pipeline 904 may include the set of codes 904A. The set of codes 904A may define a lambda function named as "glambda_structure_count( )", a lambda function named as "glambda_backbone_count( )", a lambda function named as "glambda_structure_volume( )", and a lambda function named as "glambda_backbone_length( )". The "glambda_structure_count( )" may be the lambda function that may determine a determine a count of a structure such as, a structure "v". The "glambda_backbone_count( )" may be the lambda function that may determine a determine a count of a backbone atoms in the structure such as, the structure "v". The "glambda_structure_volume( )" may be the lambda function that may determine a determine a volume of the structure such as, the structure "v". The "glambda_backbone_length( )" may be the lambda function that may determine a determine a length of a backbone atom in the structure such as, the structure "v".

It should be noted that the scenario 900B of FIG. 9B is an example and such an example should not be construed to limit the scope of the disclosure.

Figure 10:
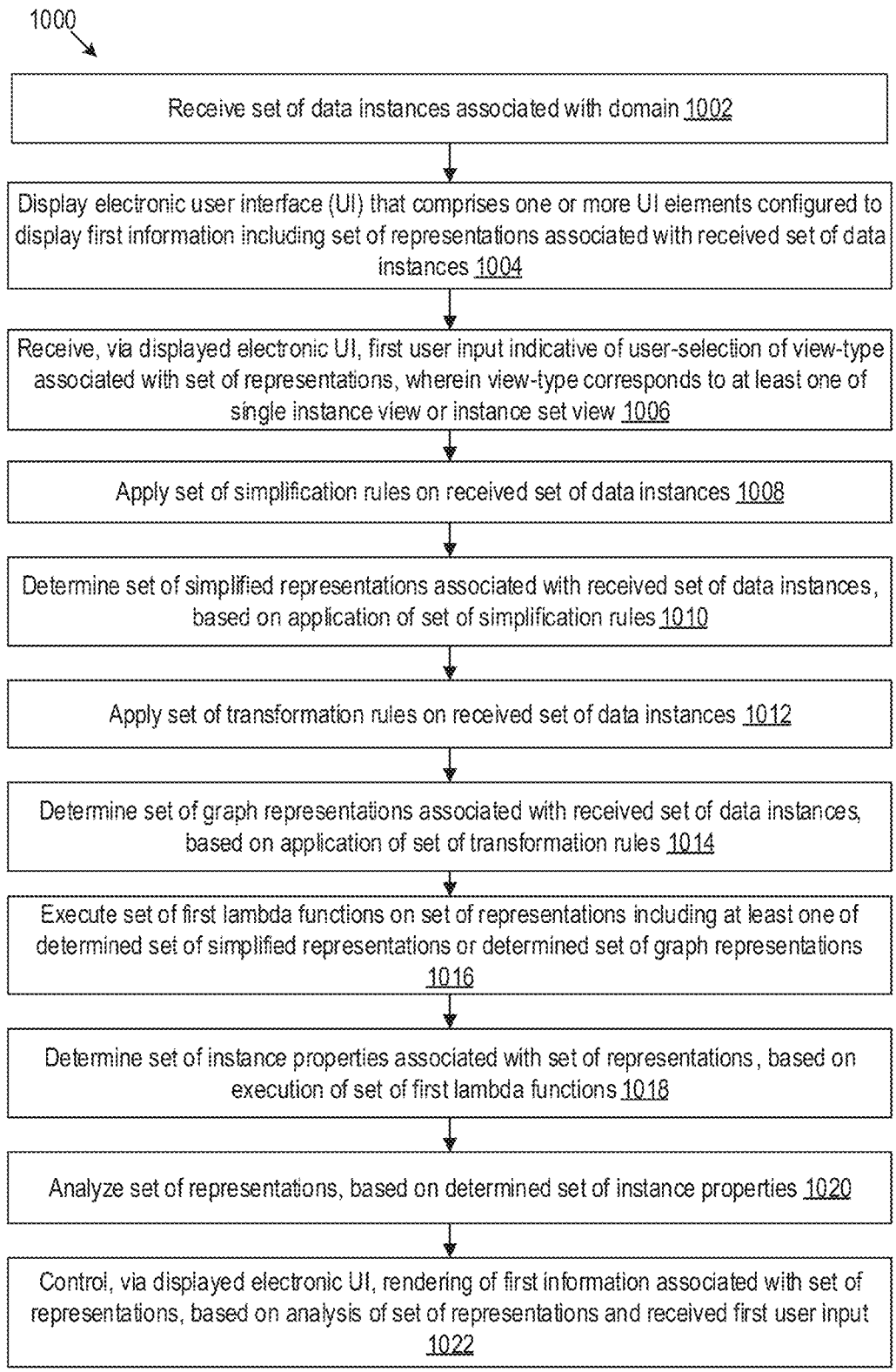
FIG. 10 is a diagram that illustrates a flowchart of an example method for the task-specific graph set analysis and visualization.

FIG. 10 is a diagram that illustrates a flowchart of an example method for the task-specific graph set analysis and visualization, in accordance with an embodiment of the disclosure. FIG. 10 is described in conjunction with elements from FIG. 1, FIG. 2, FIG. 3A, FIG. 3B, FIG. 4, FIG. 5, FIG. 6, FIG. 7, FIG. 8, FIG. 9A, and FIG. 9B. With reference to FIG. 10, there is shown a flowchart 1000. The method illustrated in the flowchart 1000 may start at 1002 and may be performed by any suitable system, apparatus, or device, such as, by the example electronic device 102 of FIG. 1, or the processor 202 of FIG. 2. Although illustrated with discrete blocks, the steps and operations associated with one or more of the blocks of the flowchart 1000 may be divided into additional blocks, combined into fewer blocks, or eliminated, depending on the particular implementation.

At block 1002, the set of data instances 110 associated with the domain may be received. In an embodiment, the processor 202 may be configured to receive the set of data instances 110 associated with the domain. Details related to the reception of the set of data instances 110 are further provided, for example, in FIG. 3A.

At block 1004, the electronic UI, (such as, the framework UI 708 of FIG. 7) may be displayed. The electronic UI may comprise one or more UI elements configured to display the first information including the set of representations associated with the received set of data instances 110. In an embodiment, the processor 202 may be configured to display the electronic UI (such as, the framework UI 708 of FIG. 7), that may comprise one or more UI elements configured to display the first information including the set of representations associated with the received set of data instances 110. Details related to the displaying the electronic UI are further provided, for example, in FIG. 3B.

At block 1006, the first user input indicative of the user-selection of the view-type associated with the set of representations may be received. In an embodiment, the processor 202 may be configured to receive, via the displayed electronic UI, the first user input indicative of the user-selection of the view-type associated with the set of representations, wherein the view-type may correspond to at least one of the single instance view or the instance set view. Details related to the reception of the first user input are further provided, for example, in FIG. 3A.

At block 1008, the set of simplification rules 302A may be applied on the received set of data instances 110. In an embodiment, the processor 202 may be configured to apply the set of simplification rules 302A on the received set of data instances 110. Details related to the application of the set of simplification rules 302A are further provided, for example, in FIG. 3A.

At block 1010, the set of simplified representations 310 associated with the received set of data instances 110 may be determined, based on the application of the set of simplification rules 302A. In an embodiment, the processor 202 may be configured to determine the set of simplified representations 310 associated with the received set of data instances 110, based on the application of the set of simplification rules 302A. Details related to the determination of the set of simplified representations 310 are further provided, for example, in FIG. 3A.

At block 1012, the set of transformation rules 304A may be applied on the received set of data instances 110. In an embodiment, the processor 202 may be configured to apply the set of transformation rules 304A on the received set of data instances 110. Details related to the application of the set of transformation rules 304A are further provided, for example, in FIG. 3A.

At block 1014, the set of graph representations 312 associated with the received set of data instances 110 may be determined, based on the application of the set of transformation rules 304A. In an embodiment, the processor 202 may be configured to determine the set of graph representations 312 associated with the received set of data instances 110, based on the application of the set of transformation rules 304A. Details related to the determination of the set of graph representations 312 are further provided, for example, in FIG. 3A.

At block 1016, the set of first lambda functions 306A may be executed on the set of representations including at least one of the determined set of simplified representations 310 or the determined set of graph representations 312. In an embodiment, the processor 202 may be configured to executing the set of first lambda functions 306A on the set of representations including at least one of the determined set of simplified representations 310 or the determined set of graph representations 312. Details related to the execution of the set of first lambda functions 306A are further provided, for example, in FIG. 3A.

At block 1018, the set of instance properties 314 associated with the set of representations may be determined, based on the execution of the set of first lambda functions 306A. In an embodiment, the processor 202 may be configured to determine the set of instance properties 314 associated with the set of representations, based on the execution of the set of first lambda functions 306A. Details related to the determination of the set of instance properties 314 are further provided, for example, in FIG. 3A.

At block 1020, the set of representations may be analyzed, based on the determined set of instance properties 314. In an embodiment, the processor 202 may be configured to analyze the set of representations, based on the determined set of instance properties 314. Details related to the analyzing of the set of representations are further provided, for example, in FIG. 3A.

At block 1022, rendering of the first information associated with the set of representations may be controlled via the displayed electronic UI, based on the analysis of the set of representations and the received first user input. In an embodiment, the processor 202 may be configured to control, via the displayed electronic UI, rendering of the first information associated with the set of representations, based on the analysis of the set of representations and the received first user input. Details related to the rendering of the first information are further provided, for example, in FIG. 3B. Control may pass to end.

Although the flowchart 1000 is illustrated as discrete operations, such as 1002, 1004, 1006, 1008, 1010, 1012, 1014, 1016, 1018, 1020, and 1022. However, in certain embodiments, such discrete operations may be further divided into additional operations, combined into fewer operations, or eliminated, depending on the particular implementation without detracting from the essence of the disclosed embodiments.

Various embodiments of the disclosure may provide one or more non-transitory computer-readable storage media configured to store instructions that, in response to being executed, cause a system (such as, the example electronic device 102) to perform operations. The operations may include receiving the set of data instances 110 associated with the domain. The operations may further include applying the set of simplification rules 302A on the received set of data instances 110. The operations may further include determining the set of simplified representations 310 associated with the received set of data instances 110, based on the application of the set of simplification rules 302A. The operations may further include applying the set of transformation rules 304A on the received set of data instances 110. The operations may further include determining the set of graph representations 312 associated with the received set of data instances 110, based on the application of the set of transformation rules 304A. The operations may further include executing the set of first lambda functions 306A on the set of representations including at least one of the determined set of simplified representations 310 or the determined set of graph representations 312. The operations may further include determining the set of instance properties 314 associated with the set of representations, based on the execution of the set of first lambda functions 306A. The operations may further include analyzing the set of representations, based on the determined set of instance properties 314. The operations may further include controlling rendering of first information associated with the set of representations, based on the analysis of the set of representations.

Various embodiments of the disclosure may provide one or more non-transitory computer-readable storage media configured to store instructions that, in response to being executed, cause a system (such as, the example electronic device 102) to perform operations. The operations may include receiving the set of data instances 110 associated with the domain. The operations may further include displaying the electronic UI, (such as, the framework UI 708 of FIG. 7) that may comprise one or more UI elements configured to display the first information including the set of representations associated with the received set of data instances 110. The operations may further include receiving, via the displayed electronic UI, the first user input indicative of the user-selection of the view-type associated with the set of representations, wherein the view-type may correspond to at least one of the single instance view or the instance set view. The operations may further include applying the set of simplification rules 302A on the received set of data instances 110. The operations may further include determining the set of simplified representations 310 associated with the received set of data instances 110, based on the application of the set of simplification rules 302A. The operations may further include applying the set of transformation rules 304A on the received set of data instances 110. The operations may further include determining the set of graph representations 312 associated with the received set of data instances 110, based on the application of the set of transformation rules 304A. The operations may further include executing the set of first lambda functions 306A on the set of representations including at least one of: the determined set of simplified representations 310 or the determined set of graph representations 312. The operations may further include determining the set of instance properties 314 associated with the set of representations, based on the execution of the set of first lambda functions 306A. The operations may further include analyzing the set of representations, based on the determined set of instance properties 314. The operations may further include controlling, via the displayed electronic UI, rendering of the first information associated with the set of representations, based on the analysis of the set of representations and the received first user input.

As used in the present disclosure, the terms "module" or "component" may refer to specific hardware implementations configured to perform the actions of the module or component and/or software objects or software routines that may be stored on and/or executed by general purpose hardware (e.g., computer-readable media, processing devices, etc.) of the computing system. In some embodiments, the different components, modules, engines, and services described in the present disclosure may be implemented as objects or processes that execute on the computing system (e.g., as separate threads). While some of the system and methods described in the present disclosure are generally described as being implemented in software (stored on and/or executed by general purpose hardware), specific hardware implementations or a combination of software and specific hardware implementations are also possible and contemplated. In this description, a "computing entity" may be any computing system as previously defined in the present disclosure, or any module or combination of modulates running on a computing system.

Terms used in the present disclosure and especially in the appended claims (e.g., bodies of the appended claims) are generally intended as "open" terms (e.g., the term "including" should be interpreted as "including, but not limited to," the term "having" should be interpreted as "having at least," the term "includes" should be interpreted as "includes, but is not limited to," etc.).

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc.

Further, any disjunctive word or phrase presenting two or more alternative terms, whether in the description, claims, or drawings, should be understood to contemplate the possibilities of including one of the terms, either of the terms, or both terms. For example, the phrase "A or B" should be understood to include the possibilities of "A" or "B" or "A and B."

All examples and conditional language recited in the present disclosure are intended for pedagogical objects to aid the reader in understanding the present disclosure and the concepts contributed by the inventor to furthering the art and are to be construed as being without limitation to such specifically recited examples and conditions. Although embodiments of the present disclosure have been described in detail, various changes, substitutions, and alterations could be made hereto without departing from the spirit and scope of the present disclosure.

What is claimed is:

1. A computer-implemented method, executed by a processor, comprising:
    receiving a set of data instances associated with a domain, the data instances including instance properties;
    applying a set of rules on the received set of data instances;
    determining a set of representations associated with the received set of data instances, based on the application of the set of rules, the set of representations resembling the set of data instances, the instance properties are associated with the set of representations and the instance properties identify a total number of each part of speech present in the data instances;
    applying a set of transformation rules on the received set of data instances;
    determining a set of graph representations associated with the received set of data instances, based on the application of the set of transformation rules;
    executing a set of first lambda functions on a set of representations including at least one of the determined set of representations or the determined set of graph representations;
    determining a set of instance properties associated with the set of representations, based on the execution of the set of first lambda functions;
    analyzing the set of representations, based on the determined set of instance properties; and
    controlling rendering of first information associated with the set of representations, based on the analysis of the set of representations.

2. The method according to claim 1, further comprising:
    determining whether the domain corresponds to a protein data domain;
    extracting atoms from the received set of data instances based on the determination that the domain corresponds to the protein data domain;
    determining, for each atom, whether a current atom is a backbone atom; and
    determining second information indicative of co-ordinates of the current atom and an atom type of the current atom, based on the determination that the current atom is not the backbone atom, wherein
        the determination of the set of representations is further based on the determined second information.

3. The method according to claim 1, further comprising:
    determining whether the domain corresponds to a protein data domain;
    extracting atoms from the received set of data instances based on the determination that the domain corresponds to the protein data domain;
    determining, for each atom, whether a current atom is a backbone atom; and
    determining third information indicative of co-ordinates of the current atom and edges between a previous atom and the current atom, based on the determination that each of the previous atom and the current atom is the backbone atom, wherein
        the determination of the set of graph representations is further based on the determined third information.

4. The method according to claim 1, further comprising:
    determining whether the domain corresponds to a textual data domain;
    extracting paragraphs from the received set of data instances, based on the determination that the domain corresponds to the textual data domain;
    creating phrase tokens from each of the extracted paragraphs;
    applying tokenization on each sentence of each of the extracted paragraphs based on the created phrase tokens; and
    generating a bag-of-words vector associated with the received set of data instances, based on the application of the tokenization, wherein
        the determination of the set of representations is further based on the generated bag-of-words vector.

5. The method according to claim 1, further comprising:
    determining whether the domain corresponds to a textual data domain;
    extracting a set of sentences from the received set of data instances, based on the determination that the domain corresponds to the textual data domain;
    converting the extracted set of sentences to a set of parse trees; and
    merging the set of parse trees to obtain a graph, wherein
        the determination of the set of graph representations is further based on the obtained graph.

6. The method according to claim 1, further comprising:
    applying a syntactical check on each lambda function of a set of second lambda functions to determine whether the corresponding lambda function is syntactically correct;
    determining a set of third lambda functions from the set of second lambda functions, based on the application of the syntactical check and a determination that the set of third lambda functions are syntactically correct;
    testing each of the determined set of third lambda functions on a subset of the set of representations to determine whether the corresponding lambda function is valid; and determining the set of first lambda functions from the determined set of third lambda functions, based on the testing of the determined set of third lambda functions and a determination that the set of first lambda functions are valid.

7. The method according to claim 6, further comprising:
creating a first sampled reductions associated with the set of representations;
creating a second sampled reductions associated with the set of graph representations;
applying a test run of the determined set of third lambda functions on each of the created first sampled reductions and the created second sampled reductions; and
determining, for each of the determined set of third lambda functions, whether the applied test run completes within a predefined time, wherein
the determination of the set of first lambda functions is further based on a determination that, for each of the set of first lambda functions, the applied test run completes within the predefined time.

8. The method according to claim 1, further comprising:
receiving a first user input indicative of a user-selection of a view-type associated with the set of representations; and
determining the first information based on the received first user input.

9. The method according to claim 8, wherein the view-type corresponds to at least one of a single instance view or an instance set view.

10. The method according to claim 9, wherein the single instance view includes at least one of:
a first user interface element configured to accept a user-selection of a single data instance from the received set of data instances,
an embedded data instance view configured to render the user-selected single data instance,
a rendering view configured to render a representation associated with user-selected single data instance, or
a graph rendering view configured to render a graph representation associated with user-selected single data instance.

11. The method according to claim 9, wherein the instance set view includes at least one of:
a second user interface element configured to accept a user-selection of an instance property of the determined set of instance properties
a third user interface element configured to accept a user-selection of a plurality of data instances from the received set of data instances,
a plurality of rendering views configured to render a plurality of representations of the determined set of representations, or
a plurality of graph rendering views configured to render a plurality of graph representations of the determined set of graph representations.

12. The method according to claim 1, further comprising:
receiving a second user input indicative of a user-selection of at least one of an instance property of the determined set of instance properties, a representation of the determined set of representations, or a graph representation of the determined set of graph representations; and
determining the first information based on the received second user input.

13. One or more non-transitory computer-readable storage media configured to store instructions that, in response to being executed, cause an electronic device to perform operations, the operations comprising:
receiving a set of data instances associated with a domain, the data instances including instance properties;
applying a set of rules on the received set of data instances;
determining a set of representations associated with the received set of data instances, based on the application of the set of rules, the set of representations resembling the set of data instances, the instance properties are associated with the set of representations and the instance properties identify a total number of each part of speech present in the data instances;
applying a set of transformation rules on the received set of data instances;
determining a set of graph representations associated with the received set of data instances, based on the application of the set of transformation rules;
executing a set of first lambda functions on a set of representations including at least one of the determined set of representations or the determined set of graph representations;
determining a set of instance properties associated with the set of representations, based on the execution of the set of first lambda functions;
analyzing the set of representations, based on the determined set of instance properties; and
controlling rendering of first information associated with the set of representations, based on the analysis of the set of representations.

14. The one or more non-transitory computer-readable storage media according to claim 13, the operations further comprising:
determining whether the domain corresponds to a protein data domain;
extracting atoms from the received set of data instances based on the determination that the domain corresponds to the protein data domain;
determining, for each atom, whether a current atom is a backbone atom; and
determining second information indicative of co-ordinates of the current atom and an atom type of the current atom, based on the determination that the current atom is not the backbone atom,
the determination of the set of representations is further based on the determined second information.

15. The one or more non-transitory computer-readable storage media according to claim 13, the operations further comprising:
determining whether the domain corresponds to a protein data domain;
extracting atoms from the received set of data instances based on the determination that the domain corresponds to the protein data domain;
determining, for each atom, whether a current atom is a backbone atom; and
determining third information indicative of co-ordinates of the current atom and edges between a previous atom and the current atom, based on the determination that each of the previous atom and the current atom is the backbone atom, wherein
the determination of the set of graph representations is further based on the determined third information.

16. The one or more non-transitory computer-readable storage media according to claim 13, the operations further comprising:

determining whether the domain corresponds to a textual data domain;

extracting paragraphs from the received set of data instances, based on the determination that the domain corresponds to the textual data domain;

creating phrase tokens from each of the extracted paragraphs;

applying tokenization on each sentence in each of the extracted paragraphs based on the created phrase tokens; and generating a bag-of-words vector associated with the received set of data instances, based on the application of the tokenization, wherein the determination of the set of representations is further based on the generated bag-of-words vector.

17. The one or more non-transitory computer-readable storage media according to claim 13, the operations further comprising:

determining whether the domain corresponds to a textual data domain;

extracting a set of sentences from the received set of data instances, based on the determination that the domain corresponds to the textual data domain;

converting the extracted set of sentences to a set of parse trees; and merging the set of parse trees to obtain a graph, wherein the determination of the set of graph representations is further based on the obtained graph.

18. The one or more non-transitory computer-readable storage media according to claim 13, the operations further comprising:

applying a syntactical check on each lambda function of a set of second lambda functions to determine whether the corresponding lambda function is syntactically correct;

determining a set of third lambda functions from the set of second lambda functions, based on the application of the syntactical check and a determination that the set of third lambda functions are syntactically correct;

testing each of the determined set of third lambda functions on a subset of the set of representations to determine whether the corresponding lambda function is valid; and determining the set of first lambda functions from the determined set of third lambda functions, based on the testing of the determined set of third lambda functions and a determination that the set of first lambda functions are valid.

19. The one or more non-transitory computer-readable storage media according to claim 18, the operations further comprising:

creating a first sampled reductions associated with the set of representations;

creating a second sampled reductions associated with the set of graph representations;

applying a test run of the determined set of third lambda functions on each of the created first sampled reductions and the created second sampled reductions; and determining, for each of the determined set of third lambda functions, whether the applied test run completes within a predefined time, wherein the determination of the set of first lambda functions is further based on a determination that, for each of the set of first lambda functions, the applied test run completes within the predefined time.

20. A computer-implemented device, comprising:

a memory configured to store instructions; and a processor, coupled to the memory, configured to execute the instructions to perform a process comprising:

receiving a set of data instances associated with a domain, the data instances including instance properties;

displaying an electronic user interface (UI) that comprises one or more UI elements configured to display first information including a set of representations associated with the received set of data instances, wherein the set of representations include at least one of a set of representations or a set of graph representations;

receiving, via the displayed electronic UI, a first user input indicative of a user-selection of a view-type associated with the set of representations, wherein the view-type corresponds to at least one of a single instance view or an instance set view;

applying a set of rules on the received set of data instances;

determining the set of representations associated with the received set of data instances, based on the application of the set of rules, the set of representations resembling the set of data instances, the instance properties are associated with the set of representations and the instance properties identify a total number of each part of speech present in the data instances;

applying a set of transformation rules on the received set of data instances;

determining the set of graph representations associated with the received set of data instances, based on the application of the set of transformation rules;

executing a set of first lambda functions on the set of representations;

determining a set of instance properties associated with the set of representations, based on the execution of the set of first lambda functions;

analyzing the set of representations, based on the determined set of instance properties; and controlling, via the displayed electronic UI, rendering of the first information associated with the set of representations, based on the analysis of the set of representations and the received first user input.

* * * * *